(12) United States Patent
Morizono et al.

(10) Patent No.: US 6,310,164 B1
(45) Date of Patent: Oct. 30, 2001

(54) UNSATURATED COPOLYMERS, PROCESSES FOR PREPARING THE SAME, AND COMPOSITIONS CONTAINING THE SAME

(75) Inventors: Kenichi Morizono; Keiji Okada; Masayoshi Yamaguchi, all of Waki-cho (JP)

(73) Assignee: Mitsu Chemicals INC, Tokyo (JP)

( * ) Notice: Subject to any disclaimer, the term of this patent is extended or adjusted under 35 U.S.C. 154(b) by 0 days.

(21) Appl. No.: 09/118,901

(22) Filed: Jul. 20, 1998

(30) Foreign Application Priority Data

Jul. 18, 1997 (JP) .................................................. 9-194663
Jul. 18, 1997 (JP) .................................................. 9-194664
Jul. 18, 1997 (JP) .................................................. 9-194665

(51) Int. Cl.$^7$ ........................ C08F 236/04; C08F 236/10
(52) U.S. Cl. ........................ 526/339; 526/126; 526/127; 526/131; 526/132; 526/134; 526/153; 526/160; 526/161; 526/340; 526/347; 524/574; 524/575
(58) Field of Search .................................. 526/339, 340, 526/347, 160, 161, 126, 127, 131, 132, 134, 153; 524/574, 575

(56) References Cited

U.S. PATENT DOCUMENTS

| | | | |
|---|---|---|---|
| 3,280,082 | * 10/1966 | Natta et al. | 526/339 X |
| 3,931,127 | * 1/1976 | Halasa et al. | 526/339 X |
| 3,948,868 | * 4/1976 | Powers | 526/339 X |
| 4,288,581 | * 9/1981 | Wieder et al. | 526/339 X |
| 5,191,052 | 3/1993 | Welborn, Jr. . | |
| 5,260,394 | * 11/1993 | Tazaki et al. | 526/347 |
| 5,739,225 | * 4/1998 | Tazaki et al. | 526/340 X |
| 6,084,046 | * 7/2000 | Johoji et al. | 526/339 |

FOREIGN PATENT DOCUMENTS

| | | |
|---|---|---|
| 0275676 | 7/1988 | (EP) . |
| 61123664 | 6/1986 | (JP) . |
| 278687 | 3/1990 | (JP) . |
| WO95/35333 | 12/1995 | (WO) . |

OTHER PUBLICATIONS

Makromol. Chem. 179, 2173–2185 (1978)—"Ethylene–Butadiene Copolymers, 1 Preparation with Modified Vanadium Catalysts".

Makromol. Chem. 192, 2591–2601 (1991)—C NMR analysis of α–olefins copolymers with 1,3–butadiene obtained with zirconocenes/methylalumoxane . . . .

Makromol. Chem. Phys., 197, 1071–1083 (1996)—Influence of polymerizatrion conditions on the copolymerization of styrene . . . Ziegler–Natta catalysts.

Macromolecules 28, 4665–4667 (1995)—Regiospecificity of Ethylene–Styrene Copolymerization with a Homogeneous Zirconocene Catalyst.

Journal of Polymer Science, Part B, Polymer Physics, vol. 26, 2113–2126, (1988)—"Copolymerization of Ethylene and Butadiene with . . . Catalyst".

Polymer Bulletin 31, 271–278, (1993)—Synthesis of ethylene–propylene–diene terpolymers with supported Ziegler--Natta catalyst.

* cited by examiner

Primary Examiner—Fred Teskin

(57) ABSTRACT

Unsaturated copolymer which is a copolymer of an α-olefin of 2 to 12 carbon atoms and a conjugated diene monomer represented by the following formula (I-a) and has the properties: (a) in said copolymer, 1,2-addition units (including 3,4-addition units) derived from the conjugated diene monomer (I-a) form double bonds in the side chain of the copolymer, 1,4-addition units derived from the conjugated diene monomer (I-a) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 10/90 to 99/1 (b) five-membered rings are present in the main chain of said copolymer; and (c) the quantity ratio of the double bonds from all of the addition units to the five-membered rings (total of double bonds from all addition units/five-membered rings) is in the range of 20/80 to 90/10;

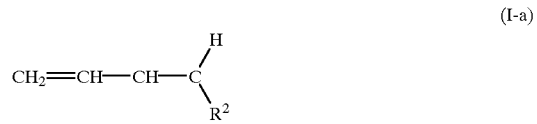

(I-a)

wherein $R^2$ is a hydrogen atom, an alkyl group of 1 to 8 carbon atoms or an aryl group.

27 Claims, No Drawings

UNSATURATED COPOLYMERS, PROCESSES FOR PREPARING THE SAME, AND COMPOSITIONS CONTAINING THE SAME

FIELD OF THE INVENTION

The present invention relates to unsaturated copolymer, processes for preparing the copolymers and compositions containing the copolymers. More particularly, the invention relates to unsaturated copolymers having excellent weathering resistance, heat resistance, low-temperature resistance, crosslinking efficiency and oil resistance, and also relates to processes for preparing the copolymers and to compositions containing the copolymers.

BACKGROUND OF THE INVENTION

Soft resins such as butadiene rubber (BR), isoprene rubber (IR) and styrene-butadiene rubber (SBR) have been hitherto used for molded articles such as tires. However, if the soft resins are used molded articles requiring weathering resistance, heat resistance and low-temperature resistance (e.g., various automobile parts), the resins tend to undergo oxidative deterioration thereby to be lowered in the properties. Therefore, further improvement of the weathering resistance, the heat resistance and the low-temperature resistance of the resins is eagerly desired.

The reason why lowering of properties is brought about when molded articles of the soft resins are used under severe conditions is that the double bonds in the main chains of the resins give rise to oxidative deterioration. Therefore, it is desired to decrease the quantity of the double bonds in the main chain to the smallest.

When the soft resins such as SBR, EPR and ethylene/propylene/nonconjugated diene copolymer (EPT) are used for rubber molded articles, they are subjected to peroxide crosslinking or radical modification. Therefore, elastomers having high crosslinking efficiency and high reaction efficiency, being almost free from lowering of properties after reaction and being inexpensive are desired.

Especially in case of peroxide crosslinking, a large amount of a peroxide is necessary if the crosslinking efficiency of the soft resin is low. Use of a large amount of a peroxide occasionally causes decomposition reaction of the main chain of the soft resin. Additionally, use of a large amount of a peroxide may cause a problem of remaining of the peroxide in the resulting crosslinked product.

The conventional EPT is still insufficient in the crosslinking efficiency, and especially when it is subjected to peroxide crosslinking, the properties of the resulting crosslinked product are not always satisfactory. Therefore, further improvement of the properties such as compression set is desired.

The present inventors have earnestly studied to solve such problems as mentioned above. As a result, they have found that an unsaturated copolymer, which is obtained by random copolymerizing an α-olefin, a specific conjugated diene monomer and optionally an aromatic vinyl compound and which has such properties that: the content of 1,2-addition units (including 3,4-addition units) derived from the diene is high, double bonds are present in the main chain and the side chain of the copolymer in a specific ratio, five-membered rings are present in the copolymer, and the double bonds and the five-membered rings are present in a specific ratio, is excellent in compatibility, weathering resistance, heat resistance, low-temperature resistance, crosslinking efficiency and modification efficiency. The present inventors have also found that the above copolymer has a low glass transition temperature and is capable of being industrially produced efficiently. Based on the finding, the present invention has been accomplished.

With respect to an ethylene/1,3-butadiene copolymer, the following literature (1) to (5) is known.

(1) Journal of Polymer Science, Part B, Polymer Physics, Vol. 26, 2113–2126 (1988), discloses an ethylene/1,3-butadiene copolymer prepared by the use of a supported Ziegler catalyst. According to this literature, the copolymer has butadiene-butadiene bond and is a block-like copolymer. The activity of the catalyst is low (not more than 10 kg/g-Ti). The butadiene units are mainly trans-1,4-addition units, and methyl methacrylate (MMA) or maleic anhydride is grafted on the double bond positions of the addition units to prepare a graft polymer with MMA.

(2) Makromol. Chem. 179, 2173–2185 (1978), discloses an ethylene/1,3-butadiene copolymer prepared by the use of a vanadium catalyst. According to this literature, 1,2-addition unit from the 1,3-butadiene is hardly contained in the copolymer, and the butadiene units are mainly trans 1,4-addition units. Besides, activity of the catalyst is low.

(3) Polymer Bulletin 31, 271–278 (1993), discloses an ethylene/propylene/1,3-butadiene copolymer prepared by the use of Ziegler catalyst. According to this literature, 1,2-addition units and 1,4-addition units from the 1,3-butadiene and propylene units are confirmed to be present in the copolymer, but the activity of the catalyst is low (not more than 10 kg/g-Ti).

The catalysts described in the literature (1) to (3) are low in the activity, and the resulting copolymers do not have any five-membered ring and any three-membered ring. The copolymers described in the literature (1) and (2) do not have any 1,2-addition unit derived from the butadiene.

(4) Makromol. Chem. 192, 2591–2601 (1991), discloses an ethylene/1,3-butadiene copolymer and an ethylene/propylene/1,3-butadiene copolymer both prepared by the use of a metallocene catalyst of biscyclopentadienyl type. According to this literature, the copolymers do not have any 1,2-addition unit and any three-membered ring though they have 1,4-addition units and five-membered rings. Besides, the activity of each catalyst is low (5 kg/mM-Zr).

(5) International Publication WO88/04672 (applied in 1986; corresponding to U.S. Pat. No. 5,191,052 applied on Mar. 2, 1993; corresponding to European Patent No. EP0275676B1 applied on Sep. 7, 1994), discloses an ethylene/1,3-butadiene copolymer prepared by the use of a metallocene catalyst of biscyclopentadienyl type. According to this publication, the copolymer has 1,2-addition units, 1,4-addition units and five-membered rings, but the quantity ratio therebetween is not described. In the examples, the quantity of the 1,2-addition units which are particularly useful is very small, and any three-membered ring structure is not referred to. Besides, the activity of the catalyst is very low (not more than 1 kg/mM-Zr·hr).

OBJECT OF THE INVENTION

The present invention is intended to solve such problems associated with the prior art as described above, and it is an object of the invention to provide unsaturated copolymers which show excellent compatibility with other polar group-containing resins, are excellent in weathering resistance, heat resistance, low-temperature resistance, crosslinking efficiency and modification efficiency, have low glass transition temperature and are economically advantageous.

It is another object of the invention to provide processes capable of efficiently and industrially preparing unsaturated copolymers having the above-mentioned excellent properties.

It is a further object of the invention to provide modified products of the unsaturated copolymers.

SUMMARY OF THE INVENTION

The first unsaturated copolymer (sometimes referred to as "first copolymer" simply) according to the invention is a copolymer of an α-olefin of 2 to 12 carbon atoms and a conjugated diene monomer represented by the following formula (I-a) and has the following properties:

(a) in said copolymer, 1,2-addition units (including 3,4-addition units) derived from the conjugated diene monomer (I-a) form double bonds in the side chain of the copolymer, 1,4-addition units derived from the conjugated diene monomer (I-a) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 10/90 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10;

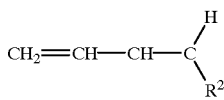
(I-a)

wherein $R^2$ is a hydrogen atom, an alkyl group of 1 to 8 carbon atoms or an aryl group.

In the first unsaturated copolymer, the conjugated diene monomer is desirably 1,3-butadiene.

In a preferred embodiment of the first unsaturated copolymer, the α-olefin is ethylene or a combination of ethylene and an α-olefin of 3 to 12 carbon atoms, and in case of said combination, the molar ratio of ethylene to the α-olefin of 3 to 12 carbon atoms is in the range of 99/1 to 40/60.

In a preferred embodiment of the invention, cyclopropane rings are further present in the main chain of the copolymer.

In a preferred embodiment of the invention, the constituent units derived from the conjugated diene monomer are contained in the copolymer in the total amount of 0.01 to 30% by mol.

In a preferred embodiment of the invention, the copolymer has an iodine value of 1 to 50 g/100 g, an intrinsic viscosity (η), as measured in Decalin (a trademark for decahydronaphthalene) at 135° C., of 0.01 to 10 dl/g and a glass transition temperature Tg of not higher than 25° C.

The first modified unsaturated copolymer according to the invention is a modified unsaturated copolymer obtained by graft modifying the above-described copolymer with at least one compound selected from the group consisting of (i) an unsaturated carboxylic acid or its derivative and (ii) an aromatic vinyl compound, in which the graft ratio of the unsaturated carboxylic acid or its derivative is in the range of 0.01 to 30% by weight.

The first unsaturated copolymer-containing elastomer composition comprises:

(a) the above-described copolymer, and (b) a crosslinking agent and/or a filler.

The process for preparing an unsaturated copolymer according to the invention is a process comprising copolymerizing an α-olefin of 2 to 12 carbon atoms and at least one conjugated diene monomer represented by the above formula (I-a) in the presence of a catalyst to prepare the first unsaturated copolymer, in which at least one catalyst system comprising the following component (a) and at least one compound selected from the following components (b), (c) and (d) is used as the catalyst;

(a) a transition metal complex represented by the following formula (II) or (III):

(II)

(III)

wherein M is Ti, Zr, Hf, Nd, Sm or Ru; Cp1 and Cp2 are each a cyclopentadienyl group, an indenyl group, a fluorenyl group or any of their derivatives, that is n-bonded to M; $X^1$ and $X^2$ are each an anionic ligand or a neutral Lewis base ligand; Y is a ligand containing a nitrogen atom, an oxygen atom, a phosphorus atom or a sulfur atom; and Z is C, O, B, S, Ge, Si, Sn or a group containing any of these atoms;

(b) a compound which reacts with the transition metal M in the component (a) to form an ionic complex, (c) an organoaluminum compound, and (d) aluminoxane.

The second unsaturated copolymer according to the invention is a copolymer of an α-olefin of 2 to 12 carbon atoms and a conjugated diene monomer represented by the following formula (I-b):

(I-b)

wherein $R^1$ is an alkyl group of 1 to 8 carbon atoms or an aryl group.

In a preferred embodiment of the second unsaturated copolymer, the copolymer is a copolymer of an α-olefin of 2 to 12 carbon atoms and a conjugated diene monomer represented by the above formula (I-b) and has the following properties:

(a) in said copolymer, 1,2-addition units (including 3,4-addition units) derived from the conjugated diene monomer (I-b) form double bonds in the side chain of the copolymer, 1,4-addition units derived from the conjugated diene monomer (I-b) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 5/95 to 99/1.

In a preferred embodiment of the second unsaturated olefin copolymer, the copolymer is a copolymer of an α-olefin of 2 to 12 carbon atoms and a conjugated diene imonomer represented by the above formula (I-b) and has the following properties:

(a) in said copolymer, 1,2-addition units (including 3,4-addition units) derived from the conjugated diene monomer (I-b) form double bonds in the side chain of the copolymer, 1,4-addition units derived from the conjugated diene monomer (I-b) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10.

In the second unsaturated copolymer, the conjugated diene monomer is desirably isoprene.

In the present invention, it is desirable that the α-olefin is ethylene or a combination of ethylene and an α-olefin of 3 to 12 carbon atoms, and in case of said combination, the molar ratio of ethylene to the α-olefin of 3 to 12 carbon atoms is in the range of 99/1 to 40/60.

In the second unsaturated copolymer, it is desirable that cyclopropane rings are further present in the main chain of the copolymer.

In the second unsaturated copolymer, it is desirable that the constituent units derived from the conjugated diene monomer are contained in the total amount of 0.01 to 30% by mol.

In a preferred embodiment of the second unsaturated copolymer, the copolymer has an iodine value of 1 to 50 g/100 g, an intrinsic viscosity (η), as measured in decalin at 135° C., of 0.01 to 10 dl/g and a glass transition temperature Tg, as measured by DSC, of not higher than 25° C.

The second unsaturated copolymer-containing elastomer composition according to the invention comprises:

(a) the second unsaturated copolymer (second copolymer), and (b) a crosslinking agent and/or a filler.

The process for preparing an unsaturated copolymer according to the invention is a process comprising copolymerizing an α-olefin of 2 to 12 carbon atoms and at least one conjugated diene monomer represented by the above formula (I-b) in the presence of a catalyst to prepare the second unsaturated copolymer, in which the aforesaid catalyst system is used as the catalyst.

The third unsaturated (random) copolymer according to the invention is a copolymer of an α-olefin of 2 to 12 carbon atoms, an aromatic vinyl compound and a conjugated diene monomer.

In a preferred embodiment of the third unsaturated copolymer, the copolymer is a copolymer of an α-olefin of 2 to 12 carbon atoms, an aromatic vinyl compound and a conjugated diene monomer represented by the following formula (I) and has the following properties:

(a) in said copolymer, 1,2-addition units (including 3,4-addition units) derived from the conjugated diene monomer (I) form double bonds in the side chain of the copolymer, 1,4-addition units derived from the conjugated diene monomer (I) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 10/90 to 99/1;

(I)

wherein $R^1$ and $R^2$ are each independently a hydrogen atom, an alkyl group of 1 to 8 carbon atoms or an aryl group, and at least one of $R^1$ and $R^2$ is a hydrogen atom.

In a preferred embodiment of the third unsaturated copolymer, the copolymer is a copolymer of an α-olefin of 2 to 12 carbon atoms, an aromatic vinyl compound and a conjugated diene monomer represented by the above formula (I) and has the following properties:

(a) in said copolymer, 1,2-addition units (including 3,4-addition units) derived from the conjugated diene monomer (I) form double bonds in the side chain of the copolymer, 1,4-addition units derived from the conjugated diene monomer (I) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 10/90 to 99/1, (b) five-membered rings are present in the main chain of said copolymer, (c) the quantity ratio of the double bonds from all of the addition units to the five-membered rings (total of double bonds from all addition units/five-membered rings) is in the range of 20/80 to 90/10, and (d) the constituent units derived from the aromatic vinyl compound are contained in an amount of 0.1 to 60% by mol.

In the third unsaturated copolymer (third copolymer) of the invention, it is desirable that the constituent units derived from the conjugated diene monomer are contained in the total amount of 0.01 to 30% by mol.

In the third unsaturated copolymer, the conjugated diene monomer is desirably 1,3-butadiene or isoprene.

In the third unsaturated copolymer, it is desirable hat the α-olefin is ethylene or a combination of thylene and an α-olefin of 3 to 12 carbon atoms, and in case of said combination, the molar ratio of ethylene to the α-olefin of 3 to 12 carbon atoms is in the range of 99/1 to 40/60.

In the third unsaturated copolymer, the aromatic vinyl compound is desirably styrene.

In the third unsaturated copolymer, it is desirable that cyclopropane rings are further present in the main chain of the copolymer.

The third unsaturated copolymer desirably has an iodine value of 1 to 50 g/100 g, an intrinsic viscosity (η), as measured in Decalin (a trademark for decahydronaphthalene) at 135° C., of 0.01 to 10 dl/g and a glass transition temperature Tg of not higher than 25° C.

The peak of a melting point (Tm) of the third unsaturated copolymer, as measured by DSC, is desirably not higher than 120° C.

The third modified copolymer according to the invention is a modified copolymer obtained by graft modifying the third unsaturated copolymer with at least one compound selected from the group consisting of (i) an unsaturated carboxylic acid or its derivative and (ii) an aromatic vinyl compound, in which the graft ratio is in the range of 0.01 to 30% by weight.

The third unsaturated copolymer-containing elastomer composition according to the invention comprises:

(a) the third unsaturated copolymer, and
(b) a crosslinking agent and/or a filler.

The process for preparing an unsaturated copolymer according to the invention is a process comprising copolymerizing an α-olefin of 2 to 12 carbon atoms, an aromatic vinyl compound and at least one conjugated diene monomer represented by the above formula (I) in the presence of a catalyst to prepare the third unsaturated copolymer, in which the aforesaid catalyst system is used as the catalyst.

The crosslinked product according to the invention is a crosslinked product obtained by crosslinking any of the above-described compositions. In the present invention, a crosslinking agent used for crosslinking the composition is desirably an organic peroxide.

The film or the sheet according to the invention comprises the above-mentioned crosslinked product.

The unsaturated copolymers according to the invention are excellent in weathering resistance, heat resistance, low-temperature resistance, compatibility, oil resistance, crosslinking efficiency and modification efficiency, have low glass transition temperature and are economically advantageous.

According to the processes of the invention, unsaturated copolymers having the above-mentioned excellent properties can be efficiently and industrially prepared.

The modified unsaturated copolymers according to the invention show good compatibility with other elastomers and resins.

DETAILED DESCRIPTION OF THE INVENTION

The first, the second and the third unsaturated copolymers (sometimes inclusively referred to as "unsaturated copolymers" simply) according to the invention are described in detail hereinafter.

Unsaturated Copolymer

The first unsaturated copolymer (sometimes referred to as "first copolymer" simply) according to the invention is a copolymer of at least one α-olefin of 2 to 12 carbon atoms and at least one conjugated diene monomer (I-a) described later.

The second unsaturated copolymer (sometimes referred to as "second copolymer" simply) according to the invention is a copolymer of at least one α-olefin of 2 to 12 carbon atoms and at least one conjugated diene monomer (I-b) described later.

The third unsaturated (random) copolymer (sometimes referred to as "third copolymer" simply) according to the invention is a copolymer of at least one α-olefin of 2 to 12 carbon atoms, an aromatic vinyl monomer and at least one conjugated diene monomer (I) described later. The conjugated diene monomer (I) is the conjugated diene monomer (I-a) and/or the conjugated diene monomer (I-b).

There is no specific limitation on the α-olefin used for preparing the unsaturated copolymers, as far as the α-olefin has 2 to 12 carbon atoms. The α-olefin may be straight-chain or may have a branch.

Examples of the α-olefins include ethylene, propylene, 1-butene, 2-butene, 1-pentene, 1-hexene, 1-heptene, 1-octene, 1-nonene, 1-decene, 1-undecene, 1-dodecene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene. These α-olefins can be used singly or in combination of two or more kinds.

When the α-olefin is used singly, an α-olefin of 2 to 5 carbon atoms is preferable and ethylene is particularly preferable. When two or more kinds of the α-olefins are used in combination, a combination of ethylene and an α-olefin of 3 or more carbon atoms is preferable. The molar ratio of ethylene to the α-olefin of 3 or more carbon atoms (ethylene/α-olefin of 3 or more carbon atoms) is preferably in the range of 99/1 to 40/60. In consideration of possibility of lowering the glass transition temperature Tg of the resulting copolymer, the molar ratio is preferably in the range of 90/10 to 60/40. The molar ratio is preferably in the range of 85/15 to 70/30. When the resulting copolymer is used as an elastomer, the molar ratio is particularly preferably in the range of 80/20 to 55/45.

The conjugated diene monomer for use in the invention is represented by the following formula (I):

(I)

wherein $R^1$ and $R^2$ are each independently a hydrogen atom, an alkyl group of 1 to 8 carbon atoms or an aryl group, and at least one of $R^1$ and $R^2$ is a hydrogen atom.

There is no specific limitation on the conjugated diene monomer (I), and it may be an aromatic conjugated diene monomer or an aliphatic conjugated diene monomer.

Examples of the conjugated diene monomers (I) include 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene and 2-phenyl-1,3-butadiene. The conjugated diene monomers can be used singly or in combination of two or more kinds.

Especially in the first unsaturated copolymer, a conjugated diene monomer represented by following formula (I-a) is used as the conjugated diene monomer.

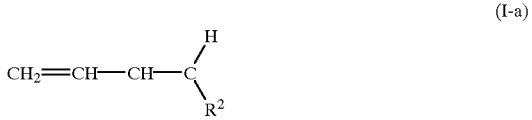

(I-a)

wherein $R^2$ is a hydrogen atom, an alkyl group of 1 to 8 carbon atoms or an aryl group.

There is no specific limitation on the conjugated diene monomer (I-a), and it may be an aromatic conjugated diene monomer or an aliphatic conjugated diene monomer.

Examples of the conjugated diene monomers (I-a) include 1,3-butadiene, 1,3-pentadiene, 1,3-hexadiene, 1,3- heptadiene, 1,3-octadiene, 1-phenyl-1,3-butadiene and 1-phenyl-2,4-pentadiene among the aforesaid examples. Of these, 1,3-butadiene is particularly preferable because it has excellent copolymerizability and crosslinking efficiency.

Especially in the second unsaturated copolymer, a conjugated diene monomer represented by following formula (I-b) is used as the conjugated diene monomer.

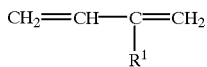

(I-b)

wherein $R^1$ is an alkyl group of 1 to 8 carbon atoms or an aryl group.

There is no specific limitation on the conjugated diene monomer (I-b), and it may be an aromatic conjugated diene monomer or an aliphatic conjugated diene monomer.

Examples of the conjugated diene monomers (I-b) include isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene and 2-phenyl-1,3-butadiene among the aforesaid examples. Of these, isoprene is particularly preferable because it has excellent copolymerizability and crosslinking efficiency.

In the third unsaturated copolymer, the aforesaid conjugated diene monomer (I) is employable. Of the aforesaid examples, 1,3-butadiene and isoprene are particularly preferable because they have excellent copolymerizability.

The aromatic vinyl compound, which is optionally used in the invention, is a compound having one carbon-carbon double bond (C=C) per one substituent bonded to the aromatic ring. Examples of such compounds include:

styrene;

mono or polyalkylstyrenes, such as o-methylstyrene, m-methylstyrene, p-methylstyrene, o,p-dimethylstyrene, o-ethylstyrene, m-ethylstyrene and p-ethylstyrene;

functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and vinylbenzene; and other compounds, such as 3-phenylpropylene, 4-phenylbutene and α-methylstyrene.

Of these, styrene or 4-methoxystyrene is preferable.

The aromatic vinyl compounds can be used singly or in combination of two or more kinds.

The first and the second unsaturated copolymers of the invention generally contain:

constituent units derived from the α-olefin (starting material), and constituent units of 1,2-addition units (including 3,4-addition units) and 1,4-addition units derived from the conjugated diene (starting material).

Preferably, the first and the second unsaturated copolymers further contain constituent units of five-membered rings (cyclopentane rings) formed in the main chain.

Similarly to the first and the second unsaturated copolymers, the third unsaturated copolymer (unsaturated terpolymer, α-olefin/aromatic vinyl compound/conjugated diene copolymer) of the invention generally contains:

constituent units derived from the α-olefin (starting material), constituent units of 1,2-addition units (including 3,4-addition units) and 1,4-addition units derived from the conjugated diene (starting material).

Preferably, the third unsaturated copolymer further contains constituent units of five-membered rings (cyclopentane rings) formed in the main chain and further constituent units derived from the aromatic vinyl compound.

The unsaturated olefin copolymers of the invention may furthermore contain cyclopropane constituent units in addition to the above-mentioned constituent units.

In this specification, the "1,2-addition units" and the "3,4-addition units" may be inclusively referred to as "1,2-addition units" simply.

The unsaturated copolymers (the first, the second and the third unsaturated copolymer) of the invention have the following properties.

(a) In the unsaturated copolymers of the invention, the 1,2-addition units (including 3,4-addition units) derived from the conjugated diene monomer form double bonds in the side chain of the copolymer, and the 1,4-addition units derived from the conjugated diene monomer form double bonds of cis or trans form in the main chain of the copolymer.

Especially in the first unsaturated copolymer (first copolymer) of the invention, the double bonds of the side chain derived from the 1,2-addition units and the double bonds of the main chain derived from the 1,4-addition units are desirably present in such amounts that the molar ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 10/90 to 99/1, preferably 12/88 to 90/10.

Especially in the second unsaturated copolymer (second copolymer) of the invention, the double bonds are desirably present in such amounts that the above molar ratio (side chain double bonds derived from 1,2-addition units/main chain double bonds derived from 1,4-addition units) is in the range of 5/95 to 99/1, preferably 10/99 to 99/1, more preferably 20/80 to 90/10.

Especially in the third unsaturated copolymer (third copolymer) of the invention, the double bonds are desirably present in such amounts that the above molar ratio (side chain double bonds derived from 1,2-addition units/main chain double bonds derived from 1,4-addition units) is in the range of 5/95 to 99/1, preferably 10/99 to 99/1. When the conjugated diene monomer is a conjugated diene monomer having the formula (I) wherein $R^1$ is a hydrogen atom and $R^2$ is a hydrogen atom or an alkyl group, e.g., butadiene, the above ratio is more preferably in the range of 12/88 to 90/10. When the conjugated diene monomer is a conjugated diene monomer having the formula (I) wherein $R^1$ is an alkyl group and $R^2$ is a hydrogen atom, e.g., isoprene, the above ratio is more preferably in the range of 20/80 to 90/10.

If the double bonds (C=C) are present in each of the copolymers in the above-mentioned ratios, respectively, the copolymers are improved in weathering resistance, heat resistance, crosslinking efficiency, low-temperature resistance and modification efficiency.

(b) Five-membered rings (cyclopentane rings) are present in the main chain of the unsaturated copolymers of the invention.

(c) In the unsaturated copolymers, the double bonds from the addition units and the five-membered rings are desirably present in such amounts that the molar ratio of the double bonds from all of the addition units (all of 1,2-, 3,4-, and 1,4-addition units) to the five-membered rings (total of double bonds from all kinds of addition units/five-membered rings) becomes 20/80 to 90/10, and that the molar ratio becomes preferably 30/70 to 80/20 in consideration of balance between the glass transition temperature Tg and the iodine value of the resulting copolymers.

The five-membered rings present in the unsaturated copolymers include cis form and trans form.

The mechanism of production of the five-membered ring has not been made clear yet, but in case of the first unsaturated copolymer comprising ethylene as the α-olefin and 1,3-butadiene as the conjugated diene as shown in the following, it is presumed that to an oligomer chain (P) or a prepolymer chain (P) that is formed by the reaction of the α-olefin (ethylene) with the conjugated diene monomer (1,3-butadiene), 1,3-butadiene (conjugated diene) is 1,2-added and then ethylene (α-olefin) is further added, followed by intramolecular cyclization, whereby a five-membered ring is produced. This production mechanism is as shown in the following chart, wherein the symbol "Cat" denotes a catalyst and the symbol "P" denotes an oligomer chain or a prepolymer chain.

measuring apparatus (manufactured by Japan Electron Optics Laboratory Co., Ltd.), and identification of the structures of the 1,4-addition unit and the five-membered ring can be made on the resulting chart by means of chemical shift described in "Makromol. Chem." 192, 2591–2601 (1991).

Identification and quantitative determination of the following 1,2-addition unit can be made by $^1$H-NMR, $^{13}$C-NMR and two-dimensional NMR of $^1$H and $^{13}$C.

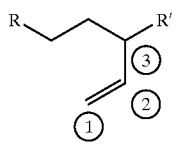

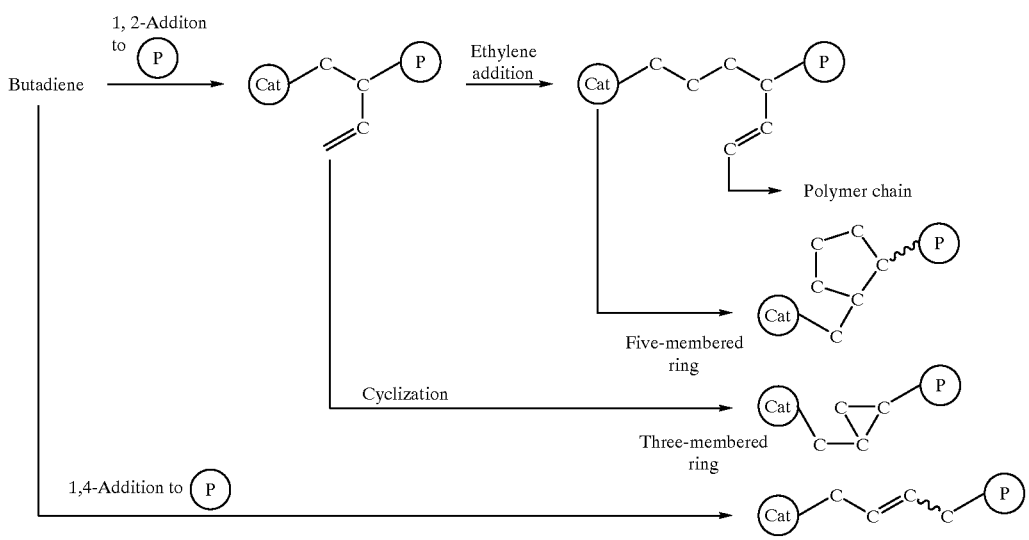

The cyclopropane ring (three-membered ring) is presumed to be produced by intramolecular cyclization after 1,2-addition of the conjugated diene such as butadiene to the oligomer chain or the prepolymer chain, as shown above. The five-membered ring and the cyclopropane ring contribute to improvement of compatibility of the copolymers, so that the copolymers have good compatibility with styrene elastomers such as SBR. The copolymers also have excellent processability.

The production ratio by mol of the cyclopropane rings to the five-membered rings (cyclopropane ring/five-membered ring) is in the range of preferably 0.1/99.9 to 50/50, more preferably 0.1/99.9 to 30/70.

Identification and quantitative determination of the five-membered ring and the cyclopropane ring (three-membered ring) can be made by $^{13}$C-NMR.

More specifically, in case of the ethylene/1,3-butadiene copolymer, identification of the copolymer can be made by measuring NMR using a hexachlorobutadiene solvent under the conditions of 110° C. and 100 MHz by means of a NMR The chemical shift of each NMR is shown in Table 1A.

TABLE 1A

|  | 1 | 2 | 3 |
|---|---|---|---|
| Chemical shift of $^{13}$C-NMR | 110–115 ppm, | 140–145 ppm, | 40–45 ppm |
| Chemical shift of $^1$H-NMR | 4.9–5.0 ppm, | 5.2–5.9 ppm, | 1.6–2.0 ppm |

Identification and quantitative determination of the following cyclopropane ring can be made by $^{13}$C-NMR and $^1$H-NMR similarly to the above and further by a C—H coupling constant that is inherent in the cyclopropane ring.

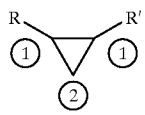

The chemical shift of each NMR is shown in Table 2A.

TABLE 2A

|  | 1 | 2 |
|---|---|---|
| Chemical shift of $^{13}$C-NMR | 16–22 ppm | 10–15 ppm |
| Chemical shift of $^1$H-NMR | 0.2–0.4 ppm | 0.0–0.2 ppm |
| Coupling constant ($J_{CH}$) | 154 | 156 |

The ratio between the components and the quantity ratio between the structures derived from the conjugated diene can be determined by the ratio between areas of the peaks in the $^1$H-NMR and/or the $^{13}$C-NMR.

Also in the second unsaturated copolymer, five-membered rings are present, and mechanism of production of the five-membered ring has not been made clear yet, but it is presumed that to an oligomer chain or a prepolymer chain that is formed by the reaction of the α-olefin with the conjugated diene, isoprene (conjugated diene) is 1,2-added or 3,4-added and then ethylene (α-olefin) is further added, followed by intramolecular cyclization, whereby a five-membered ring is produced.

Identification and quantitative determination of the five-membered ring can be made by $^{13}$C-NMR similarly to the above.

Identification and quantitative determination of the following 3,4-addition unit can be made by $^1$H-NMR, $^{13}$C-NMR and two-dimensional NMR of $^1$H and $^{13}$C.

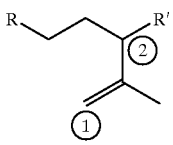

The chemical shift of each NMR is shown in Table 1B.

TABLE 1B

|  | 1 | 2 |
|---|---|---|
| Chemical shift of $^{13}$C-NMR | 110–115 ppm | 40–45 ppm |
| Chemical shift of $^1$H-NMR | 4.9–5.0 ppm | 1.6–2.0 ppm |

Identification and quantitative determination of the 1,2-addition unit can be made in the similar manner because it shows similar chemical shift to that of the 3,4-addition unit.

The ratio between the components and the quantity ratio between the structures derived from the conjugated diene can be determined by the ratio between areas of the peaks in the $^1$H-NMR and/or the $^{13}$C-NMR, similarly to the above.

Also in case of an ethylene/styrene/1,3-butadiene copolymer as the third unsaturated copolymer, identification and quantitative determination of the addition units, etc. can be made in accordance with the methods described above.

Identification of styrene can be made by means of chemical shift of "Makromol. Chem. Phys." 197, 1071–1083 (1996) and "Macromolecules" 28, 4665–4667 (1995).

The ratio between the components and the quantity ratio between the structures derived from the conjugated diene can be determined by the ratio between areas of the peaks in the $^1$H-NMR and/or the $^{13}$C-NMR, similarly to the above.

In the first unsaturated copolymer of the invention, it is desirable that the constituent units derived from the conjugated diene monomer, namely, 1,2-addition units (including 3,4-addition units, the same shall apply hereinafter), 1,4-addition units, five-membered rings (cyclopentane structure) and cyclopropane rings (three-membered rings), are contained in the total amount of 0.01 to 30% by mol, preferably 0.1 to 20% by mol. The residual constituent units are constituent units derived from the α-olefin such as ethylene.

In the second unsaturated copolymer of the invention, it is desirable that the constituent units derived from the conjugated diene monomer, namely, 1,2-addition units (including 3,4-addition units), 1,4-addition units and five-membered rings (cyclopentane structure), are contained in the total amount of 0.01 to 30% by mol, preferably 0.1 to 15% by mol. The residual constituent units are constituent units derived from the α-olefin such as ethylene.

In the third unsaturated copolymer of the invention, it is desirable that the constituent units derived from the conjugated diene monomer, namely, 1,2-addition units (including 3,4-addition units), 1,4-addition units, five-membered rings (cyclopentane structure) and cyclopropane rings (three-membered rings), are contained in the total amount of 0.01 to 30% by mol, preferably 0.1 to 15% by mol. The residual constituent units are constituent units derived from the α-olefin such as ethylene and the aromatic vinyl compound such as styrene.

In the third unsaturated copolymer, the constituent units derived from the aromatic vinyl compound are contained in an amount of 0.1 to 60% by mol, preferably 0.1 to 40% by mol, more preferably 0.5 to 30% by mol; and the constituent units derived from the α-olefin such as ethylene are contained in an amount of 10 to 99.89% by mol, preferably 45 to 99.8% by mol, more preferably 50 to 99.6% by mol.

When the first, the second and the third unsaturated copolymers contain the constituent units in the above-mentioned amounts, they have excellent surface hardness, abrasion resistance, vibration insulation properties and damping properties and show good compatibility with other polar resins and fillers.

The unsaturated copolymers of the invention desirably have an iodine value of usually 1 to 50, preferably 3 to 50, more preferably 3 to 40. If the iodine value of the copolymers is in this range, the copolymers show high crosslinking rate when they are crosslinked to form rubbers, and the resulting crosslinked products have excellent low-temperature properties.

The unsaturated copolymers of the invention have an intrinsic viscosity (η), as measured in decalin at 135° C., of usually 0.01 to 10.0 dl/g. If the copolymers are used for waxes, wax additives, release agents, lubricants or oil modifiers, their intrinsic viscosity (η) is in the range of preferably 0.01 to 1.0 dl/g. If the copolymers are applied to other uses, their intrinsic viscosity (η) is in the range of preferably 1.0 to 7.0 dl/g, more preferably 1.0 to 5.0 dl/g. When the intrinsic viscosity (η) of the copolymers is in the above range, the copolymers show excellent weathering resistance, ozone resistance, heat aging resistance, low-temperature properties and dynamic fatigue resistance.

The unsaturated copolymers of the invention have a single glass transition temperature, and it is desirable that the glass transition temperature Tg, as measured by differential scanning calorimeter (DSC), is usually not higher than 25° C., preferably not higher than 10° C., more preferably not higher than 0° C., particularly preferably not higher than –30° C., most preferably not higher than –35° C. The lower limit of Tg is usually –150° C.

When the glass transition temperature Tg of the copolymers is in the above range, the copolymers have excellent low-temperature resistance and low-temperature properties.

In some cases, the unsaturated copolymers having no aromatic vinyl compound unit are preferable to the unsaturated copolymers having aromatic vinyl compound units from the viewpoints of glass transition temperature and low-temperature properties.

With increase of the quantity of the ring structure units in each copolymer, the glass transition temperature tends to be increased. On the other hand, with increase of the quantity of the cis 1,4-addition units, the 1,2-addition units (or 3,4-addition units) and the α-olefin units, the glass transition temperature tends to be decreased. Accordingly, the ratio between the components in each copolymer is substantially defined by defining the range of the glass transition temperature.

In the present invention, it is preferable that at least one of the quantity ratio between α-olefins in case of using two or more different α-olefins, the iodine value of the copolymer, the intrinsic viscosity (η) of the copolymer and the glass transition temperature Tg of the copolymer is within the above range, it is more preferable that two or more of them are within the above ranges, and it is particularly preferable that all of them are within the above ranges.

The Mw/Mn value (in terms of polystyrene) of each copolymer, as measured by GPC, is preferably not more than 3.0. The melting point (Tm) of each copolymer, as measured by DSC, is usually not higher than 120° C., preferably not higher than 110° C., more preferably not higher than 70° C. When the copolymer is used as an elastomer, the melting point is particularly preferably not higher than 40° C.

The crystallinity of each copolymer, as measured by X-ray diffractometry, is preferably not more than 15%, more preferably not more than 10%. However, if the copolymers of the invention are used for films, they do not always have the above-mentioned Tm or crystallinity.

Each of the unsaturated copolymers of the invention, particularly an ethylene/$C_{3-12}$ α-olefin/conjugated diene copolymer having a melting point (Tm) of not higher than 40° C., has a degree of oil swelling of preferably not more than 90%, more preferably not more than 85%, based on the degree of oil swelling of an ethylene/$C_{3-12}$ α-olefin/5-ethylidene-2-norbornene copolymer (X) which has the same intrinsic viscosity (η), iodine value, ethylene content and α-olefin of 3 to 12 carbon atom as those of the copolymer of the invention. The degree of oil swelling is an indication of crosslinking reactivity and is measured in the manner described below.

The expression "the copolymer (X) has the same intrinsic viscosity (η), iodine value and ethylene content as those of the copolymer of the invention" used herein means that the intrinsic viscosity (η), the iodine value and the ethylene content of the copolymer (X) are within the ranges of ±10% of values of the intrinsic viscosity (η), the iodine value and the ethylene content of the unsaturated copolymer of the invention, respectively. If a monomer other than the above monomers is copolymerized in the unsaturated copolymer of the invention, the copolymer (X) further containing the same monomer is used to measure the degree of oil swelling.

In the measurement of the degree of oil swelling, 70 parts by weight of the unsaturated copolymer of the invention or the copolymer (X) as a reference, 30 parts by weight of homopolypropylene (MFR at 230° C.: 10–20 g/min), 0.1 part by weight of divinylbenzene and 0.15 part by weight of 2,5-dimethyl-2,5-(tert-butylperoxyhexane) are homogeneously mixed, and the mixture is kneaded at 200° C. for 5 minutes by a melt kneading machine, e.g., labo plastomill (manufactured by Toyoseiki Seisakujo) to obtain an olefin thermoplastic elastomer. Then, the degree of oil swelling of the elastomer is measured.

Preparation of Unsaturated Copolymer

The first unsaturated copolymer of the invention can be obtained by copolymerizing, preferably random copolymerizing at least one α-olefin of 2 to 12 carbon atoms and at least one conjugated diene monomer represented by the formula (I-a) in the presence of an olefin polymerization catalyst, preferably the below-described metallocene catalyst.

The second unsaturated copolymer of the invention can be obtained by copolymerizing, preferably random copolymerizing at least one α-olefin of 2 to 12 carbon atoms and at least one conjugated diene monomer represented by the formula (I-b) in the presence of an olefin polymerization catalyst, preferably the below-described metallocene catalyst.

The third unsaturated copolymer (or terpolymer) of the invention can be obtained by copolymerizing, preferably random copolymerizing at least one α-olefin of 2 to 12 carbon atoms, the aromatic vinyl compound and the conjugated diene monomer represented by the formula (I) (i.e., the conjugated diene monomer (I-a) and/or the conjugated diene monomer (I-b)) in the presence of an olefin polymerization catalyst, preferably the below-described metallocene catalyst.

The metallocene catalyst employable herein is at least one catalyst comprising a transition metal complex (a) represented by the following formula (II) or (III) and at least one compound selected from the compounds (b), (c) and (d) described below.

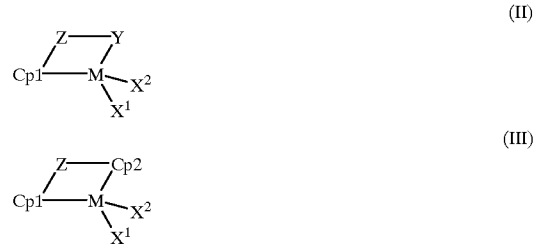

In the formulas (II) and (III), M is Ti, Zr, Hf, Nd, Sm or Ru; Cp1 and Cp2 are each a cyclopentadienyl group, an indenyl group, a fluorenyl group or any of their derivatives, that is π-bonded to M; $X^1$ and $X^2$ are each an anionic ligand or a neutral Lewis base ligand; Y is a ligand containing a nitrogen atom, an oxygen atom, a phosphorus atom or a sulfur atom; and Z is C, O, B, S, Ge, Si, Sn or a group containing any of these atoms.

The compounds (b), (c) and (d) are as follows:
(b) a compound which reacts with the transition metal M in the component (a) to form an ionic complex,
(c) an organoaluminum compound, and
(d) aluminoxane.

The transition metal complex (a) for use in the invention, which is represented by the following formula (II), is described below.

wherein M is a transition metal of Group 4 or lanthanum series of the periodic table, specifically Ti, Zr, Hf, Rn, Nd, Sm or Ru, preferably Ti, Zr or Hf; Cp1 is a cyclopentadienyl group, an indenyl group, a fluorenyl group or any of their derivatives, that is π-bonded to M; $X^1$ and $X^2$ are each an anionic ligand or a neutral Lewis base ligand; Y is a ligand containing a nitrogen atom, an oxygen atom, a phosphorus atom or a sulfur atom; Z is carbon, oxygen, sulfur, boron or an element of Group 14 of the periodic table (e.g., silicon, germanium or tin), preferably carbon, oxygen or silicon, and Z may have a substituent; and Z and Y may together form a condensed ring.

In more detail, Cp1 is a ligand coordinated to the transition metal and is a ligand having cyclopentadienyl skeleton, such as a cyclopentadienyl group, an indenyl group, a fluorenyl group or any of their derivatives. The ligand having cyclopentadienyl skeleton may have a substituent, such as an alkyl group, a cycloalkyl group, a trialkylsilyl group or a halogen atom.

Z is an atom selected from C, O, B, S, Ge, Si and Sn, and may have a substituent, such as an alkyl group or an alkoxy group. The substituents of Z may be bonded to each other to form a ring.

$X^1$ and $X^2$ are each an anionic ligand or a neutral Lewis base ligand, they may be the same or different, and they are each a hydrogen atom, a halogen atom, a hydrocarbon group, a silyl group or a germyl group, having 20 or less of carbon atoms, silicon atoms or germanium atoms.

Examples of the compounds represented by the formula (II) include:
(dimethyl(t-butylamido)(tetramethyl-$\eta^5$-cyclopentadienyl)silylene)titanium dichloride,
((t-butylamido)(tetramethyl-$\eta^5$-cyclopentadienyl)-1,2-ethanediyl)titanium dichloride,
(dimethyl(phenylamido)(tetramethyl-$\eta^5$-cyclopentadienyl)silylene)titanium dichloride,
(dimethyl(t-butylamido)(tetramethyl-$\eta^5$-cyclopentadienyl)silylene)titanium dimethyl,
(dimethyl(4-methylphenylamido)(tetramethyl-$\eta^5$-cyclopentadienyl)silylene)titanium dichloride,
(dimethyl(t-butylamido) ($\eta^5$-cyclopentadienyl)silylene)titanium dichloride, and
(tetramethyl(t-butylamido)(tetramethyl-$\eta^5$-cyclopentadienyl)disilylene)titanium dichloride.

Also employable in the invention is a transition etal compound represented by the following formula (III):

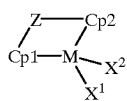

(III)

wherein M is Ti, Zr, Hf, Rn, Nd, Sm or Ru, preferably Ti, Zr or Hf; Cp1 and Cp2 are each a cyclopentadienyl group, an indenyl group, a fluorenyl group or any of their derivatives, that is π-bonded to M; $X^1$ and $X^2$ are each an anionic ligand or a neutral Lewis base ligand; and Z is C, O, B, S, Ge, Si, Sn or a group containing any of these atoms.

In the formula (III), the bonding group Z is preferably one atom selected from C, O, B, S, Ge, Si and Sn, and this atom may have a substituent, such as an alkyl group or an alkoxy group. The substituents of Z may be bonded to each other to form a ring.

Cp1 and Cp2 are each a ligand coordinated to the transition metal and are each a ligand having cyclopentadienyl skeleton, such as a cyclopentadienyl group, an indenyl group, a 4,5,6,7-tetrahydroindenyl group or a fluorenyl group. The ligand having cyclopentadienyl skeleton may have a substituent, such as an alkyl group, a cycloalkyl group, a trialkylsilyl group or a halogen atom.

$X^1$ and $X^2$ are each an anionic ligand or a neutral Lewis base ligand, specifically, an alkoxy group, an aryloxy group or a hydrocarbon group of 1 to 12 carbon atoms, a sulfonic acid-containing group (—$SO_3Ra$ wherein Ra is an alkyl group, an alkyl group substituted with a halogen atom, an aryl group, an aryl group substituted with a halogen atom, or an aryl group substituted with an alkyl group), a halogen atom or a hydrogen atom.

Examples of the metallocene compounds containing zirconium as M and containing two ligands having cyclopentadienyl skeleton include:
cyclohexylidene-bis(indenyl)dimethylzirconium,
cyclohexylidene-bis(indenyl)zirconium dichloride,
isopropylidene-bis(indenyl)zirconium dichloride,
isopropylidene(cyclopentadienyl-fluorenyl)zirconium dichloride,
diphenylsilylene-bis(indenyl)zirconium dichloride,
methylphenylsilylene-bis(indenyl)zirconium dichloride,
rac-dimethylsilylene-bis(2-methyl-1-indenyl)zirconium dichloride,
rac-dimethylsilylene-bis(4,7-dimethyl-1-indenyl)zirconium dichloride,
rac-dimethylsilylene-bis(2,4,7-trimethyl-1-indenyl)zirconium dichloride,
rac-dimethylsilylene-bis(2,4,6-trimethyl-1-indenyl)zirconium dichloride,
rac-dimethylsilylene-bis(4-phenyl-1-indenyl)zirconium dichloride,
rac-dimethylsilylene-bis(2-methyl-4-phenyl-1-indenyl)zirconium dichloride,
rac-dimethylsilylene-bis(2-methyl-4-(α-naphthyl)-1-indenyl)zirconium dichloride,
rac-dimethylsilylene-bis(2-methyl-4-(β-naphthyl)-1-indenyl)zirconium dichloride, and
rac-dimethylsilylene-bis(2-methyl-4-(1-anthryl)-1-indenyl)zirconium dichloride.

There can be also exemplified metallocene compounds wherein zirconium is replaced with titanium or hafnium in the above compounds.

The metallocene compounds mentioned above can be used singly or in combination of two or more kinds.

The metallocene compounds can be used by supporting them on particulate carriers.

Examples of the particulate carriers include inorganic carriers, such as $SiO_2$, $Al_2O_3$, $B_2O_3$, MgO, $ZrO_2$, CaO, $TiO_2$, ZnO, $SnO_2$, BaO and ThO; organic carriers, such as polyethylene, polypropylene, poly-1-butene, poly-4-methyl-1-pentene and styrene/divinylbenzene copolymer. These particulate carriers can be used singly or in combination of two or more kinds. Next, the following compounds (b), (c) and (d) for forming the metallocene compounds are described:

(b) a compound which reacts with the transition metal M in the component (a) to form an ionic complex, namely, ionizing ionic compound, (c) an organoaluminum compound, and (d) aluminoxane (aluminum oxy-compound).

(b) Ionizing Ionic Compound

The ionizing ionic compound is a compound which reacts with the transition metal M in the transition metal complex component (a) to form an ionic complex, and examples of the ionizing ionic compounds include Lewis acid, ionic compounds, borane compounds and carborane compounds.

The Lewis acid is, for example, a compound represented by the formula $BR_3$ (R is a phenyl group which may have a substituent such as fluorine, methyl or trifluoromethyl, or a fluorine atom). Examples of such compounds include trifluoroboron, triphenylboron, tris(4-fluorophenyl)boron, tris(3,5-difluorophenyl)boron, tris(4-fluoromethylphenyl) boron, tris(pentafluorophenyl)boron, tris(p-tolyl)boron, tris o-tolyl)boron and tris(3,5-dimethylphenyl)boron.

Examples of the ionic compounds include trialkyl-substituted ammonium salts, N,N-dialkylanilinium salts, dialkylammonium salts and triarylphosphonium salts. Particular examples of the trialkyl-substituted ammonium salts include triethylammoniumtetra(phenyl)boron, tripropylaimoniumtetra(phenyl)boron and tri(n-butyl) arrmoniumtetra(phenyl)boron. Particular examples of the dialkylammonium salts include di(1-propyl)ammoniumtetra (pentafluorophenyl)boron and dicyclohexylammoniumtetra (phenyl)boron. Further, triphenylcarbeniumtetrakis (pentafluorophenyl)borate, N,N-dimethylaniliniumtetrakis (pentafluorophenyl)borate and ferroceniumtetra (pentafluorophenyl)borate are also available as the ionic compounds.

Examples of the borane compounds include decaborane (14), bis[tri(n-butyl)ammonium]nonaborate, bis[tri(n-butyl) ammonium]decaborate, and salts of metallic borane anions such as bis[tri(n-butyl)ammonium]-bis (dodecahydridododecaborate)nickelate(III).

Examples of the carborane compounds include 4-carbanonaborane(14), 1,3-dicarbanonaborane(13), and salts of metallic carborane anions such as bis[tri(n-butyl) ammonium]bis(undecahydrido-7-carbaundecaborate) nickelate(IV).

The ionizing ionic compounds mentioned above can be used singly or in combination of two or more kinds.

The organoaluminum oxy-compounds and the ionizing ionic compounds can be used by supporting them on the aforesaid particulate carriers.

In the preparation of the catalyst, the below-described organoaluminum compound (c) may be used together with the organoaluminum oxy-compound and/or the ionizing ionic compound.

(c) Organoaluminum Compound

As the organoaluminum compound (c), a compound having at least one Al-carbon bond in the molecule is employable. The compound (c) is, for example, an organoaluminum compound represented by the following formula:

$$(R^1)_m Al(O(R^2))_n H_p X_q$$

wherein $R^1$ and $R^2$ may be the same or different and are each a hydrocarbon group of usually 1 to 15 carbon atoms, preferably 1 to 4 carbon atoms; X is a halogen atom; and m, n, p and q are numbers satisfying the conditions of $0<m \leq 3$, $0 \leq n<3$, $0 \leq p<3$, $0 \leq q<3$ and $m+n+p+q=3$.

(d) Organoaluminum oxy-compound (aluminoxane)

The organoaluminum oxy-compound (d) may be conventional aluminoxane or such a benzene-insoluble organoaluminum oxy-compound as exemplified in Japanese Patent Laid-Open Publication No. 78687/1990.

The conventional aluminoxane (alumoxane) is represented by the following formula:

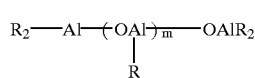

(1)

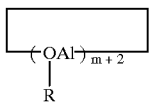

(2)

wherein R is a hydrocarbon group, such as methyl, ethyl, propyl or butyl, preferably methyl or ethyl, particularly preferably methyl; and m is an integer of 2 or greater, preferably an integer of 5 to 40.

The aluminoxane may be formed from mixed alkyloxy-aluminum units consisting of alkyloxyaluminum units represented by the formula $(OAl(R^1))$ and alkyloxyaluminum units represented by the formula $(OAl(R^2))$ ($R^1$ and $R^2$ are each the same hydrocarbon group as described for the above R, and $R^1$ and $R^2$ are different from each other).

The organoaluminum oxy-compound may contain a small amount of an organic compound of a metal other than aluminum.

In the present invention, the above-described metallocene catalyst is preferably used as the olefin polymerization catalyst, but (1) a known titanium catalyst comprising a solid titanium catalyst component and an organoaluminum compound or (2) a known vanadium catalyst comprising a soluble vanadium compound and an organoaluminum compound can be used according to circumstances.

In the present invention, (i) the α-olefin, (ii) the conjugated diene and optionally (iii) the aromatic vinyl compound are copolymerized in the presence of preferably the above-described metallocene compound, generally in a liquid phase. In this copolymerization, a hydrocarbon solvent is generally used, but an α-olefiin may be used as a solvent. The copolymerization can be carried out by any of batch-wise and continuous processes.

When the copolymerization is batchwise conducted in the presence of the metallocene catalyst, the metallocene compound is used in an amount of usually 0.00005 to 1 mmol, preferably 0.0001 to 0.5 mmol, based on 1 liter of the polymerization volume.

The organoaluminum oxy-compound is used in such an amount that the molar ratio of the aluminum atom (Al) to the transition metal atom (M) in the metallocene compound (Al/M) becomes 1 to 10,000, preferably 10 to 5,000.

The ionizing ionic compound is used in such an amount that the molar ratio of the ionizing ionic compound to the metallocene compound (ionizing ionic compound/ metallocene compound) becomes 0.5 to 20, preferably 1 to 10.

If the organoaluminum compound is used, the amount thereof is in the range of usually about 0 to 5 mmol, preferably about 0 to 2 mmol, based on 1 liter of the polymerization volume.

The copolymerization reaction is carried out under the conditions of a temperature of usually −20 to 150° C., preferably 0 to 120° C., more preferably 0 to 100° C., and a pressure of more than 0 kg/cm² and not more than 80 kg/cm², preferably more than 0 kg/cm² and not more than 50 kg/cm².

Though the reaction time (mean residence time in case of continuous polymerization process) varies depending upon the conditions such as catalyst concentration and polymerization temperature, it is in the range of usually 5 minutes to 3 hours, preferably 10 minutes to 1.5 hours.

The α-olefin (i), the conjugated diene (ii) and optionally the aromatic vinyl compound (iii) are fed to the polymerization reaction system in such amounts that the unsaturated copolymer having the aforesaid specific component ratio can be obtained. In the copolymerization, a molecular weight modifier such as hydrogen can be employed.

When the α-olefin (i), the conjugated diene (ii) and optionally the aromatic vinyl compound (iii) are copolymerized, the unsaturated copolymer is obtained generally as a polymerization solution containing said copolymer. The polymerization solution is treated in a conventional manner to obtain the unsaturated copolymer.

The unsaturated copolymers of the invention can be variously modified because they have double bonds in the main chain and the side chain. By the modification with a peroxide, the double bonds can be epoxidized to introduce epoxy groups of high reactivity into the copolymers. This makes it possible to use the copolymers as thermosetting resins or reactive resins. Further, the double bonds can be utilized for Diels-Alder reaction and Michael addition reaction. Moreover, the double bonds of the main chain can be selectively hydrogenated to saturate them, whereby the heat resistance and the ozone resistance of the copolymers can be further improved.

The unsaturated copolymers of the invention can be modified partially or wholly with an unsaturated carboxylic acid, its derivative or an aromatic vinyl compound, and the degree of modification is preferably in the range of 0.01 to 30% by weight.

Especially in the unsaturated copolymers, the double bonds which are reactive are present in the side chain, and therefore the amount of a radical initiator used for the modification can be reduced. In contrast, in resins having no double bond in the side chain, a radical produced by hydrogen abstraction reaction is an initiation point. Since not all of the initiator induce the hydrogen abstraction reaction, a large amount of thue initiator is necessary. Besides, the molecular weight is generally lowered because decomposition reaction also takes place.

In the unsaturated copolymers of the invention, terminal double bonds which are especially reactive are present in the side chain, so that the amount of the radical initiator can be decreased. Besides, the produced radical reacts mainly with the double bonds of the side chain, whereby the decomposition reaction of the main chain can be inhibited, and thereby lowering of the molecular weight can be also inhibited.

The monomer used for the modification (referred to as "graft monomer" hereinafter) includes an unsaturated carboxylic acid, its derivative and an aromatic vinyl compound. Examples of the unsaturated carboxylic acids include acrylic acid, methacrylic acid, maleic acid, fumaric acid and itaconic acid. Examples of the derivatives of unsaturated carboxylic acids include anhydrides, esters, amides, imides and metallic salts of unsaturated carboxylic acids. Specifically, there can be mentioned maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. Of the graft monomers, maleic anhydride is preferably employed.

Examples of the aromatic vinyl compounds include:
styrene;
mono or polyalkylstyrenes, such as o-methylstyrene, m-methylstyrene, p-methylstyrene, o,p-dimethylstyrene, o-ethylstyrene, m-ethylstyrene and p-ethylstyrene;
functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; and
other compounds, such as 3-phenylpropylene, 4-phenylbutene and α-methylstyrene.

Of these, styrene or 4-methoxystyrene is preferable.

For graft copolymerizing each of the unsaturated copolymers with the graft monomer to prepare a modified. copolymer, various known processes are available.

For example, the unsaturated copolymer and the graft monomer are heated at a high temperature in the presence or absence of a solvent, and in the presence or absence of a radical initiator to perform graft copolymerization. The graft copolymerization reaction may be conducted in the presence of another vinyl monomer such as styrene.

In order to prepare a partially or wholly graft-modified unsaturated copolymer having a graft ratio of 0.01 to 30% by weight, it is preferable from the viewpoint of industrial production that a graft-modified unsaturated copolymer having a high graft ratio is first prepared and the thus graft-modified unsaturated copolymer is then added to an unmodified unsaturated copolymer to adjust the graft ratio. In this process, the concentration of the graft monomer in the composition can be properly adjusted. The copolymer obtained by this process is referred to as "partially graft-modified unsaturated copolymer". It is also possible that a given amount of a graft monomer is blended with the unsaturated copolymer from the beginning to perform graft modification. The copolymer obtained by this process is referred to as "wholly graft-modified unsaturated copolymer".

As for the degree of modification of the unsaturated copolymer with the graft monomer, the graft ratio to the whole resin is in the range of preferably 0.01 to 30% by weight, particularly preferably 0.05 to 10% by weight.

The modified unsaturated copolymer (sometimes referred to as "modified copolymer" hereinafter) obtained above may be blended with an ethylene/α-olefin copolymer and/or an ethylene/vinyl acetate copolymer to prepare a modified unsaturated copolymer-containing composition.

By blending the modified unsaturated copolymer with the ethylene/α-olefin copolymer and/or the ethylene/vinyl acetate copolymer, the melt viscosity of the resulting composition can be decreased, and thereby moldability of the composition can be improved. Moreover, adhesion properties after retorting treatment can be further improved, and adhesion strength to polyolefins can be increased.

As the ethylene/α-olefin copolymer, an ethylene/α-olefin copolymer, in which ethylene and an α-olefin are copolymerized at random and which has an ethylene content of 45 to 95% by mol, preferably 45 to 90% by mol, is employed.

The ethylene/α-olefin copolymer has a melt flow rate (ASTM D 1238, conditions E) of usually 0.1 to 50 g/10 min, preferably 0.3 to 30 g/10 min, a density of usually 0.850 to 0.900 g/cm$^3$, preferably 0.850 to 0.890 g/cm$^3$, and a crystallinity, as measured by X-ray diffractometry, of usually less than 30%, preferably less than 25%.

Examples of the α-olefins forming the ethylene/α-olefin copolymer include α-olefins of 3 to 20 carbon atoms, such as propylene, 1-butene, 1-hexene, 4-methyl-1-pentene, 1-octene, 1-decene, 1-tetradecene and 1-octadecene. These α-olefins are used singly or as a mixture of two or more kinds.

The ethylene/α-olefin copolymer has a melting point (ASTM D 3418) of usually not higher than 100° C.

The ethylene/vinyl acetate copolymer desirably has a vinyl acetate content of 5 to 40% by weight, preferably 10 to 35% by weight. The ethylene/vinyl acetate copolymer has a melt flow rate (ASTM D 1238, conditions E) of usually 0.1 to 50 g/10 min, preferably 0.3 to 30 g/10 min.

The modified unsaturated copolymer-containing composition may further contain a crystalline ethylene polymer, a crystalline propylene polymer, modified products of these polymers and a tackifier in addition to the graft modified unsaturated copolymer, the ethylene/α-olefin copolymer and the ethylene/vinyl acetate copolymer.

The crystalline ethylene polymer is a homopolymer of ethylene or a copolymer of ethylene and a small amount of another α-olefin, and has an ethylene content of more than 90% by mol and not more than 100% by mol, preferably 95 to 100% by mol.

The crystalline ethylene polymer has a melt flow rate (ASTM D 1238, conditions E) of usually 0.1 to 50 g/10 min, preferably 0.3 to 30 g/10 min, and a density of usually 0.900 to 0.980 g/cm$^3$, preferably 0.920 to 0.970 g/cm$^3$.

Examples of the α-olefins forming the crystalline ethylene polymer include α-olefins of 3 to 20 carbon atoms, such as propylene, 1-butene, 1-hexene, 4-methyl-1-pentene, 1-octene, 1-decene, 1-tetradecene and 1-octadecene. These α-olefins can be used singly or in combination of two or more kinds.

The crystalline ethylene polymer may be modified with an unsaturated carboxylic acid, its derivative or an aromatic vinyl compound. Examples of the unsaturated carboxylic acids, their derivatives and the aromatic vinyl compounds are those previously described. The modified ethylene polymer can be prepared by various known processes.

The resin composition containing the crystalline ethylene polymer has excellent adhesion strength.

The crystalline propylene polymer is a homopolymer of propylene or a copolymer of propylene and an amount of another α-olefin, and has a propylene content of more than 55% by mol and not more than 100% by mol, preferably 80 to 100% by mol.

The crystalline propylene polymer has a melt flow rate (ASTM D 1238, conditions E) of usually 0.1 to 50 g/10 min, preferably 0.3 to 30 g/10 min, and a melting point (Tm) of 110 to 165° C., preferably 120 to 165° C.

Examples of the α-olefins forming the crystalline propylene polymer include ethylene and α-olefins of 4 to 20 carbon atoms, such as 1-butene, 1-hexene, 4-methyl-1-pentene, 1-octene, 1-decene, 1-tetradecene and 1-octadecene. These α-olefins can be used singly or in combination of two or more kinds.

The crystalline propylene polymer may be modified with an unsaturated carboxylic acid, its derivative or an aromatic vinyl compound. Examples of the unsaturated carboxylic acids, their derivatives and the aromatic vinyl compounds are those previously described. The modified propylene polymer can be prepared by various known processes.

The resin composition containing the crystalline propylene polymer has excellent adhesion strength.

The tackifier is added to adjust melt viscosity of the modified unsaturated copolymer-containing composition and to improve hot tack and wetting properties. Examples of preferred tackifiers include alicyclic hydrogenated tackifiers, rosins, modified rosins, esters of rosins or modified rosins, aliphatic petroleum resins, alicyclic petroleum resins, aromatic petroleum resins, petroleum resins of a copolymer comprising aliphatic component/aromatic component, low-molecular weight styrene resins, isoprene resins, alkyd resin, phenolic resins, terpene resins and coumarone-indene resin. These tackifiers can be used singly or in combination of two or more kinds.

The modified unsaturated copolymer-containing composition (sometimes referred to as "resin composition") is formed from the graft-modified unsaturated copolymer (sometimes referred to as "modified copolymer") in an amount of 1 to 100 parts by weight, preferably 1 to 80 parts by weight, more preferably 10 to 80 parts by weight, and a soft polymer in an amount of 0 to 99 parts by weight, preferably 20 to 90 parts by weight, more preferably 20 to 90 parts by weight, with the proviso that the total amount of the modified copolymer and the soft polymer is 100 parts by weight.

Examples of the soft polymers include the aforesaid ethylene/α-olefin copolymer, the aforesaid ethylene/vinyl acetate copolymer and a mixture thereof.

A preferred embodiment of the resin composition comprises 10 to 80 parts by weight of the modified copolymer and 20 to 90 parts by weight of the ethylene/α-olefin copolymer and/or the ethylene/vinyl acetate copolymer (total amount: 100 parts by weight).

More specifically, there can be exemplified:
- a composition comprising the modified copolymer in an amount of 10 to 80 parts by weight, preferably 30 to 80 parts by weight, and the ethylene/α-olefin copolymer in an amount of 20 to 90 parts by weight, preferably 20 to 70 parts by weight (total amount: 100 parts by weight),
- a composition comprising the modified copolymer in an amount of 10 to 80 parts by weight, preferably 30 to 80 parts by weight, and the ethylene/vinyl acetate copolymer in an amount of 20 to 90 parts by weight, preferably 20 to 70 parts by weight (total amount: 100 parts by weight), and
- a composition comprising the modified copolymer in an amount of 10 to 80 parts by weight, preferably 30 to 80 parts by weight, the ethylene/α-olefin copolymer in an amount of 5 to 60 parts by weight, preferably 10 to 50 parts by weight, and the ethylene/vinyl acetate copolymer in an amount of 5 to 40 parts by weight, preferably 10 to 30 parts by weight (total amount: 100 parts by weight).

As previously described, the modified unsaturated copolymer-containing composition of the invention may further contain the ethylene polymer, its modified product, the propylene polymer, its modified product and the tackifier in addition to the modified copolymer, the ethylene/α-olefin copolymer and the ethylene/vinyl acetate copolymer.

If the ethylene polymer or its modified product is added, it is used in an amount of 0.1 to 50 parts by weight, preferably 1 to 30 parts by weight, based on 100 parts by weight of the total of the modified copolymer, the ethylene/α-olefin copolymer and the ethylene/vinyl acetate copolymer.

If the propylene polymer or its modified product is; added, it is used in an amount of 0.1 to 50 parts by weight, preferably 1 to 30 parts by weight, based on 100 parts by weight of the total of the modified copolymer, the ethylene/α-olefin copolymer and the ethylene/vinyl acetate copolymer.

If the tackifier is added, it is used in an amount of 0.5 to 25 parts by weight, preferably 5 to 15 parts by weight, based on 100 parts by weight of the total of the modified copolymer, the ethylene/α-olefin copolymer and the ethylene/vinyl acetate copolymer.

As described above, the modified unsaturated copolymer-containing composition (sometimes referred to as "modified copolymer-containing composition) essentially contains the graft modified unsaturated copolymer, and the graft ratio to the whole resin composition is in the range of usually 0.01 to 30% by weight, preferably 0.05 to 10% by weight. This composition has MFR of 0.1 to 50 g/10 min, preferably 0.2 to 40 g/10 min, and a crystallinity of less than 35%.

The modified unsaturated copolymer-containing composition can be prepared by various known processes, for example, a process comprising mixing the components in the above mixing ratio by the use of a Henschel mixer, a V-type blender, a ribbon blender, a tumbling blender or the like, or a process comprising mixing in the above manner, then melt kneading the mixture by the use of a single-screw extruder, a twin-screw extruder, a kneader, a Banbury mixer or the like and granulating or powdering the kneadate.

To the modified copolymer-containing composition, additives such as heat stabilizer, weathering stabilizer, antistatic agent, pigment, dye and anti-corrosion agent can be added in amounts not detrimental to the objects of the present invention.

Since the modified copolymer-containing composition has excellent adhesion properties to polyester resins, polycarbonate resins, saponified products of olefin/vinyl acetate copolymers and polyolefin resins, it can be favorably used as an adhesive between these resins.

For example, when a polycarbonate resin layer or a polyester resin layer is bonded to a layer of a saponified ethylene/vinyl acetate copolymer using the modified copolymer-containing composition to prepare a laminate, the laminate shows excellent gas permeation resistance and suffers no ply separation when it is subjected to high-temperature filling or retort treatment. Since the laminate is low in the permeability of gas such as oxygen, it exhibits very excellent properties when used as a retort packaging material or a hot fill packaging material.

When the unsaturated copolymer (sometimes referred to as "α-olefin/conjugated diene copolymer" or "unsaturated terpolymer") of the invention is used as an elastomer, it is preferable that the unsaturated copolymer (A) be blended with at least one component selected from a crosslinking agent (B) and a filler (C) to prepare an unsaturated copolymer-containing elastomer composition (sometimes referred to as "elastomer composition" hereinafter). To the elastomer composition, an ethylene/α-olefin copolymer may be further added.

The crosslinking agent (B) employable herein is, for example, sulfur, a sulfur compound or an organic peroxide.

Examples of sulfur include powdered sulfur, precipitated sulfur, colloidal sulfur, surface treated sulfur and insoluble sulfur.

Examples of the sulfur compounds include sulfur chloride, sulfur dichloride and high-molecular polysulfides. Also employable are sulfur compounds which release active sulfur at the crosslinking temperature to crosslink the unsaturated copolymer, such as morpholine disulfide, alkylphenol disulfide, tetramethylthiuram disulfide, dipentamethylenethiuram tetrasulfide and selenium dimethyldithiocarbamate. When sulfur or the sulfur compound is used as the crosslinking agent, it is preferable to use a crosslinking accelerator in combination.

Examples of the organic peroxides include alkyl peroxides, such as dicumyl peroxide (DCP), di-t-butyl peroxide, di-t-butylperoxy-3,3,5-trimethylcyclohexane, t-butylcumyl peroxide, di-t-amyl peroxide, 2,5-dimethyl-2, 5-di(t-butylperoxy)hexyne-3, 2,5-dimethyl-2,5-di (benzoylperoxy)hexane, 2,5-dimethyl-2,5-di(t-butylperoxy) hexane, α,α'-bis(t-butylperoxy-m-isopropyl)benzene and t-butyl hydroperoxide; peroxy esters, such as t-butyl peroxyacetate, t-butyl peroxyisobutyrate, t-butyl peroxypivalate, t-butyl peroxymaleate, t-butyl peroxyneodecanoate, t-butyl peroxybenzoate and di-t-butyl peroxyphthalate; and ketone peroxides, such as dicyclohexanone peroxide. These organic peroxides can be used singly or in combination of two or more kinds.

Of the organic peroxides, preferable are those having a temperature, at which their half-life period corresponds to one minute, of 130 to 200° C. Examples of such organic peroxides include dicumyl peroxide, di-t-butyl peroxide, di-t-butylperoxy-3,3,5-trimethylcyclohexane, t-butylcumyl peroxide, di-t-amyl peroxide and t-butyl hydroperoxide. When the organic peroxide is used as the crosslinking agent, it is preferable to use a crosslinking aid in combination.

Of the above-mentioned various crosslinking agents, sulfur or the sulfur compound, particularly sulfur, is preferably used because a crosslinked product having excellent properties can be obtained. However, the organic peroxide is more preferable because of its particularly excellent crosslinking efficiency.

The unsaturated copolymers of the invention are very economically advantageous because they can be crosslinked by any of sulfur and the peroxide. Above all, the copolymer containing constituent units derived from the conjugated diene monomer of the formula (I-b) efficiently undergoes crosslinking by sulfur or the peroxide.

When the crosslinking agent (B) is sulfur or the sulfur compound, it is used in an amount of usually 0.5 to 10 parts by weight, preferably 1 to 10 parts by weight, more preferably 1 to 5 parts by weight, based on 100 parts by weight of the unsaturated copolymer (A).

When the crosslinking agent (B) is the organic peroxide, it is used in an amount of usually 0.00005 to 0.1 mol, preferably 0.0005 to 0.05 mol, based on 100 g of the unsaturated copolymer (A).

The filler (C) includes a filler exerting reinforcing effect (reinforcing filler) and a filler exerting no reinforcing effect (non-reinforcing filler).

The reinforcing filler exerts effects of enhancing mechanical properties of the crosslinked product, such as tensile strength, tear strength and abrasion resistance. Examples of such fillers include carbon black, such as SRF, GPF, FEF, MAF, HAF, ISAF, SAF, FT and MT; carbon black surface-treated with a silane coupling agent or the like; silica; activated calcium carbonate; and finely powdered talc. When carbon black is used as the filler, all of carbon black commonly used for rubbers can be used without specific limitation.

The non-reinforcing filler is used to increase hardness of rubber products without exerting so much influence on the properties or to decrease the cost. Examples of such fillers include talc, clay and calcium carbonate.

The filler (C) is used in an amount of usually not more than 300 parts by weight, preferably 10 to 300 parts by weight, more preferably 10 to 200 parts by weight, based on 100 parts by weight of the unsaturated copolymer (A).

The unsaturated copolymer-containing elastomer composition can be prepared by known processes, for example, a process comprising blending the unsaturated copolymer (A)

with other components which may contain at least one component selected from the crosslinking agent (B) and the filler (C), and other rubber compounding ingredients and kneading the mixture by an internal mixer such as a Banbury mixer, a kneader or an intermixer.

The unsaturated copolymer-containing elastomer composition according to the invention can be used in an uncrosslinked state, but its properties can be most conspicuously exhibited when the composition is used as a crosslinked product. That is, the unsaturated copolymer (A) functions to increase crosslinking rate of the composition or to improve the strength properties of the crosslinked product.

For preparing the crosslinked product from the composition not containing the crosslinking agent (B), an unsaturated copolymer-containing elastomer composition is first prepared, then molded into a desired shape and crosslinked, similarly to the case of crosslinking common rubbers. The crosslinking can be carried out by irradiation with electron rays.

For preparing the crosslinked product from the composition containing the crosslinking agent (B), an unsaturated copolymer-containing elastomer composition is first prepared, then molded into a desired shape and crosslinked by heating or the like, similarly to the case of crosslinking common rubbers.

The uncrosslinked compounded rubber (uncrosslinked unsaturated copolymer-containing elastomer composition) may further contain various rubber compounding ingredients, such as crosslinking accelerator, crosslinking aid, softener, tackifier, anti-aging agent, foaming agent, processing aid, adhesion improver, heat stabilizer, weathering stabilizer, antistatic agent, colorant, lubricant, flame retardant and anti-blooming agent, in amounts not detrimental to the objects of the present invention, in addition to the unsaturated copolymer (A), the crosslinking agent (B) and the filler (C).

Examples of the crosslinking accelerators include thiazole compounds, such as N-cyclohexyl-2-benzothiazole sulfenamide (CBZ), N-oxydiethylene-2-benzothiazole sulfenamide, N,N-diisopropyl-2-benzothiazole sulfenamide, 2-mercaptobenzothiazole, 2-(2,4-dinitrophenyl) mercaptobenzothiazole, 2-(2,6-diethyl-4-morpholinothio) benzothiazole and dibenzothiazyl disulfide; guanidine compounds, such as diphenylguanidine (DPG), triphenylguanidine, diorthonitrileguanidine, orthonitrile biguanide and diphenylguanidine phthalate; aldehyde amine compounds or aldehyde ammonia compounds, such as acetaldehyde-aniline reaction product, butylaldehyde-aniline condensate, hexamethylenetetramine and acetaldehyde ammonia; imidazoline compounds, such as 2-mercaptoimidazoline; thiourea compounds, such as thiocarbanilide, diethylthiourea, dubutylthiourea, trimethylthiourea and diorthotolylthiourea; thiuram compounds, such as tetramethylthiuram monosulfide, tetramethylthiuram disulfide, tetraethylthiuram disulfide, tetrabutylthiuram disulfide and pentamethylenethiuram tetrasulfide; dithio acid salt compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthate compounds, such as zinc dibutyl xanthate; and other compounds, such as zinc white. The crosslinking accelerator is used in an amount of 1 to 20 parts by weight, preferably 2 to 10 parts by weight, based on 100 parts by weight of the unsaturated copolymer (A).

Examples of the crosslinking aids include sulfur; quinone dioxime compounds such as p-quinone dioxime; and polyfunctional monomers, for example, methacrylate compounds (e.g., trimethylolpropane triacrylate and polyethylene glycol dimethacrylate); allyl compounds (e.g., such as diallyl phthalate and triallyl cyanurate), maleimide compounds (e.g., m-phenylenebismaleimide), and divinylbenzene. The crosslinking aid is preferably used in an amount of 0.5 to 2 mol based on 1 mol of the organic peroxide, more preferably about equimolar amount to the organic peroxide.

As the softeners, those commonly added to rubbers can be widely employed. Examples of the softeners include petroleum type softeners, such as process oil, lubricating oil, paraffin, liquid paraffin, petroleum asphalt and vaseline; coal tar type softeners, such as coal tar and coal tar pitch; fatty oil type softeners, such as castor oil, linseed oil, rapeseed oil and coconut oil; tall oil; factice; waxes, such as beeswax, carnauba wax and lanolin; fatty acids and fatty acid salts, such as ricinolic acid, palmitic acid, barium stearate, calcium stearate and zinc laurate; and synthetic high-molecular materials, such as petroleum resins, atactic polypropylene and coumarone-indene resin. Of these, preferably used are petroleum type softeners, and particularly preferably used is process oil. The softener is preferably used in an amount of not more than 200 parts by weight, more preferably 5 to 200 parts by weight, especially 10 to 150 parts by weight, still more preferably 10 to 100 parts by weight, based on 100 parts by weight of the unsaturated copolymer (A).

As the foaming agents, those commonly used for foam molding of rubbers can be widely employed. Examples of the foaming agents include inorganic foaming agents, such as sodium bicarbonate, sodium carbonate, ammonium bicarbonate, ammonium carbonate and ammonium nitrite; nitroso compounds, such as N,N'-dimethyl-N,N'-dinitrosoterephthalamide and N,N'-dinitrosopentamethyelnetetramine; azo compounds, such as azodicarbonamide, azobisisobutyronitrile, azocyclohexylnitrile, azodiaminobenzene and barium azodicarboxylate; and sulfonylhydrazide compounds, such as benzenesulfonylhydrazide, toluenesulfonylhydrazide, p,p'-oxybis(benzenesulfonylhydrazide) and diphenylsulfone-3,3'-disulfonylhydrzazide; and azide compounds, such as calcium azide, 4,4-diphenyldisulonyl azide and p-toluenesulfonyl azide. Of these, preferable are nitroso compounds, azo compounds and azide compounds. The foaming agent is used in an amount of 0.5 to 30 parts by weight, preferably 1 to 20 parts by weight, based on 100 parts by weight of the unsaturated copolymer (A). From the unsaturated copolymer-containing elastomer composition containing the foaming agent in this amount, a foamed product having an apparent specific gravity of 0.03 to 0.8 g/cm$^3$ can be obtained.

A foaming aid can be used in combination with the foaming agent. When the foaming aid is used in combination, decrease of decomposition temperature of the foaming agent, acceleration of decomposition of the foaming agent and production of uniform bubbles can be effected. Examples of the foaming aids include organic acids, such as salicylic acid, phthalic acid, stearic acid and oxalic acid; urea; and derivatives of urea. The foaming aid is preferably used in an amount of 0.01 to 10 parts by weight, more preferably 0.1 to 5 parts by weight, based on 100 parts by weight of the unsaturated copolymer (A).

As the processing aids, those commonly added to rubbers can be widely employed. Examples of the processing aids include higher fatty acids, such as ricinolic acid, stearic acid, palmitic acid and lauric acid; salts of higher fatty acids, such as barium stearate, zinc stearate and calcium stearate; and esters of higher fatty acids. The processing aid is preferably used in an amount of not more than 10 parts by weight, more preferably not more than 5 parts by weight, based on 100 parts by weight of the unsaturated copolymer (A).

The adhesion improver serves to improve adhesion strength between the crosslinked product and a decorative layer such as a coating film, and is, for example, an organotin compound, a tertiary amine compound, a hydroxyl group-containing (co)polymer or a metallic hydroxide.

Examples of organotin compounds include dialkyltin dicarboxylates, such as dibutyltin diacetate, dibutyltin dioctanoate, dibutyltin dilaurate and dioctyltin dilaurate; dialkyltin maleates, such as dibutyltin dimethylmaleate, dibutyltin dioctylmaleate, dibutyltin dioleylmaleate, dibutyltin dimethoxymethylmaleate and dibutyltin laurate methylmaleate; dialkyltin dithioglycolates, such as dibutyltin dioctylthioglycolate and dioctyltin dioctylthioglycolate; dialkyltin dimercaptides, such as dibutyltin dilaurylmercaptide and dioctyltin dilaurylmercaptide; dialkyltin dithiocarboxylates, such as dibutyltin dithioacetate, dibutyltin dithiooctanoate, dibutyltin dithiolaurate and dioctyltin dithiolaurate; dialkyltin dimercaptocarboxylates, such as dibutyltin dimercaptopropionate; dialkylhydroxytin chlorides, such as dibutylhydroxytin chloride; alkyltin trilaurates, such as butyltin trilaurate and octyltin trilaurate; alkyltin triirialeates, such as butyltin trimethylmaleate and butyltin trioctylmaleate; alkylhydroxytin dichlorides, such as butylhydroxytin dichloride; triaralkyltin maleates, such as tribenzyltin octylmaleate and tribenzyltin methylmaleate; and dialkyltin maleate polymers such as a dioctyltin maleate polymer. The organotin compound is preferably used in an amount of 0.01 to 10 parts by weight, more preferably 0.1 to 5 parts by weight, based on 100 parts by weight of the unsaturated copolymer (A).

The tertiary amine compound is, for example, a low-molecular tertiary amine compound. Examples of such compounds include monoamines, such as triethylamine, dimethylpropylamine, diethylpropylamine and N,N-dimethylcyclohexane; diamines, such as triethylenediamine, N,N,N',N'-tetramethylethylenediamine, N,N,N',N'-tetramethylpropane-1,3-diamine and N,N,N',N'-tetramethylhexane-1,6-diamine; triamines, such as N,N,N',N',N",N"-hexamethyldiethylenetriamine, N,N,N',N',N",N"-hexamethyldipropylenetriamine and tetramethylguanidine; cyclic amines, such as N,N'-dimethylpiperazine, N-methyl-N'-(2-dimethylamino)-ethylpiperazine, N-methylmorpholine, N-(N',N'-dimethylaminoethyl)-morpholine, 1,2-dimethylimidazole, 1,4-diazabicyclo-[2.2.2]-octane and 1,8-diazabicyclo-[5.4.0]-7-undecene; alcohol amines, such as dimethylaminoethanol, methylaminodiethanol, dimethylaminoethoxyethanol, N,N,N'-trimethylaminoethylethanolamine, N-methyl-N'-(2-hydroxyethyl)-piperazine and N-(2-hydroxyethyl) morpholine; phenol amines, such as tris(dimethylamino) methylphenol; ether amines, such as bis(2-dimethylaminoethyl) ether and ethylene glycol bis(3-dimethyl)aminopropyl ether; and tertiary amino group-containing unsaturated compounds, such as 2-(dimethylamino)ethyl acrylate, 2-(diethylamino)ethyl acrylate, 2-(dimethylamino)ethyl methacrylate, 2-(diethylamino)ethyl methacrylate, 2-(dibutylamino)ethyl acrylate, 2-(dibutylamino)ethyl methacrylate, 2-(dimethylamino)propylacrylamide and 2-(dimethylamino) propylmethacylamide.

Also available as the tertiary amine compound is a high-molecular compound such as a tertiary amino group-containing olefin (co)polymer.

The tertiary amino group-containing olefin (co)polymer has a structure wherein the tertiary amino group-containing unsaturated compound is regularly or irregularly copolymerized in the branched or linear hydrocarbon chain, or has a structure wherein the side chain having a tertiary amine structure is grafted, and contains the tertiary amino group-containing unsaturated compound in an amount of 0.1 to 50% by weight. The tertiary amino group-containing olefin (co)polymer can be prepared by a known process, for example, a process comprising copolymerizing the tertiary amino group-containing unsaturated compound or a process comprising graft polymerizing polyolefin with the tertiary amino group-containing unsaturated compound. Of the tertiary amine compounds mentioned above, 1,4-diazabicyclo-[2.2.2]-octane is preferably employed. The tertiary amine compound is preferably used in an amount of 0.01 to 10 parts by weight, more preferably 0.05 to 5 parts by weight, based on 100 parts by weight of the unsaturated copolymer (A).

Examples of the hydroxyl group-containing (co)polymers include a saponified product of an ethylene/vinyl acetate copolymer; conjugated diene polymers having a hydroxyl group at the end of molecule, such as polybutadiene having a hydroxyl group at the end of molecule and polyisoprene having a hydroxyl group at the end of molecule; hydrogenated products of conjugated diene polymers having a hydroxyl group at the end of molecule, such as a hydrogenated product of polybutadiene having a hydroxyl group at the end of molecule and a hydrogenated product of polyisoprene having a hydroxyl group at the end of molecule; copolymers of ethylene and hydroxyl group-containing unsaturated compounds, such as an ethylene/hydroxyethyl acrylate copolymer, an ethylene/hydroxyethyl methacrylate copolymer, an ethylene/hydroxyoctyl acrylate copolymer and an ethylene/hydorxyoctyl methacrylate copolymer; and graft-modified olefin (co)polymers, such as polyethylene, polypropylene, ethylene/α-olefin copolymers and ethylene/α-olefin/polyene copolymers all of which have been graft-modified with hydroxyl group-containing unsaturated compounds (e.g., hydroxyethyl acrylate, hydroxyethyl methacrylate, hydroxyoctyl acrylate and hydroxyoctyl methacrylate). Of these, preferable are a hydrogenated product of polybutadiene having a hydroxyl group at the end of molecule and a hydrogenated product of polyisoprene having a hydroxyl group at the end of molecule. When the hydroxyl group-containing (co)polymer is added, adhesion strength between the crosslinked product and a coating film of urethane resin can be increased. The hydroxyl group-containing (co)polymer is preferably used in an amount of 0.5 to 20 parts by weight, more preferably 1 to 15 parts by weight, based on 100 parts by weight of the unsaturated copolymer (A).

Examples of the metallic hydroxides include aluminum hydroxide, magnesium hydroxide, calcium hydroxide, iron hydroxide and nickel hydroxide. Of these, preferable are aluminum hydroxide and magnesium hydroxide, and particularly preferable is magnesium hydroxide. The metallic hydroxide is preferably used in an amount of 20 to 200 parts by weight, more preferably 20 to 150 parts by weight, still more preferably 50 to 150 parts by weight, based on 100 parts by weight of the unsaturated copolymer (A).

There is no specific limitation on the process for preparing the crosslinked product from the unsaturated copolymer-containing elastomer composition of the invention. For example, the following process is available.

In a mixer such as a Banbury mixer, the unsaturated copolymer (A), and if necessary, the filler (C), the liquid softener (D) and other rubber compounding ingredients are kneaded at a temperature of 80 to 170° C. for a period of 3 to 10 minutes. Then, using rolls such as open rolls, the crosslinking agent (B) and if necessary the crosslinking accelerator are added, and the mixture is kneaded at a roll temperature of 40 to 80° C. for a period of 5 to 30 minutes, followed by gaging, to prepare an uncrosslinked compounded rubber in the form of a ribbon or a sheet. When the kneading temperature in the internal mixer is low, the crosslinking agent (B), the crosslinking accelerator and the foaming agent can be kneaded at the same time.

The uncrosslinked compounded rubber is then molded into a desired shape by means of an extrusion molding machine, a calender roll or a press. Simultaneously with the molding, the compounded rubber is heated at a temperature of 150 to 270° C. for a period of 1 to 30 minutes, or after the molding, the molded product is introduced into a crosslinking bath and heated at a temperature of 150 to 270° C. for a period of 1 to 30 minutes, to obtain a crosslinked product. The crosslinking may be conducted in a mold or may be conducted using no mold. In case of using no mold, the molding process and the crosslinking process are generally carried out continuously. For heating the molded product in the crosslinking bath, various heating means, such as hot air, glass bead fluidized bed, UHF (ultra high frequency electromagnetic wave) and steam (heating bath), can be employed.

For preparing the crosslinked product utilizing irradiation with electron rays, the following process is available. In a mixer such as a Banbury mixer, the unsaturated olefin copolymer (A), and if necessary, the filler (C) and other rubber compounding ingredients are kneaded at a temperature of 80 to 170° C. for a period of 3 to 10 minutes. Then, using rolls such as open rolls, the kneadate is further kneaded at a roll temperature of 40 to 80° C. for a period of 5 to 30 minutes, followed by gaging to prepare an uncrosslinked compounded rubber in the form of a ribbon or a sheet. The uncrosslinked compounded rubber is then molded into a desired shape by means of an extrusion molding machine, a calender roll or a press, and the molded product is irradiated with electron rays to obtain a crosslinked product. It is desirable that the molded product is irradiated with electron rays having energy of 0.1 to 10 MeV (megaelectron volt), preferably 0.3 to 2 MeV, in such a manner that the absorbed dose becomes 0.5 to 35 Mrad (megarad), preferably 0.5 to 10 Mrad.

The unsaturated copolymers of the invention are excellent because they have high crosslink density, and especially when they are crosslinked with an organic peroxide, they show particularly high crosslink density.

The crosslinked product obtained as above is widely used for automobile parts, generally industrial parts, and civil engineering and building materials. Above all, it can be applied to uses requiring oil resistance and dynamic fatigue resistance, for example, tire treads, tire tread modifiers, automobile engine parts, rubber vibration insulators, rubber rolls, heat-resistant belts, hoses, wiper blades, electric wires, various packing, anode caps, electrically insulating materials such as grommets, civil engineering and building materials such as building gaskets and constructional sheets, and rubberized fabrics. The crosslinked product is used particularly for automobile insulators, such as engine mount insulators, center bearing insulators and rack-and-pinion steering gear insulators. The crosslinked product has excellent tear resistance.

From the unsaturated copolymer-containing elastomer composition of the invention, a foamed product can be also prepared. In the preparation of the foamed product, a foaming agent commonly used for rubbers and optionally a foaming aid are added to the elastomer composition to foam the composition. The foaming agent is preferably used in an amount of 0.5 to 30 parts by weight, more preferably 1 to 20 parts by weight, based on 100 parts by weight of the unsaturated copolymer (A). The apparent specific gravity of the resulting foamed product is usually in the range of 0.03 to 0.7. The foamed product can be used for heat insulating materials, cushioning materials, sealing materials and hoses.

From the unsaturated copolymer-containing elastomer composition (compounded rubber, including uncrosslinked one and crosslinked one) of the invention, a crosslinked molded product having a surface decorative layer can be also prepared. The crosslinked molded product having a surface decorative layer can be obtained by providing a coating on the surface of the aforesaid crosslinked product or combining the crosslinked product with a member of another material such as a metal or a resin using an adhesive to form a decorative layer. It is also possible that a decorative layer is formed on the uncrosslinked compounded rubber and the compounded rubber is then crosslinked to obtain a crosslinked molded product having a surface decorative layer.

When the unsaturated copolymer-containing elastomer composition is the third unsaturated copolymer-containing elastomer composition, e.g., an α-olefin/aromatic vinyl compound/conjugated diene copolymer-containing elastomer composition, the content of the aromatic vinyl compound is preferably in the range of 0.1 to 40% by mol, particularly 0.5 to 30% by mol, based on the above copolymer. If the content of the aromatic vinyl compound is in this range, the elastomer composition exhibits excellent coating properties.

As the coatings to coat the crosslinked or uncrosslinked compounded rubber, those currently widely used are employable. Examples of such coatings include acrylic resin coating, epoxy resin coating, polyester resin coating, urethane resin coating, alkyd resin coating, melamine resin coating and silicone resin coating.

The acrylic resin coating is a coating used as a clear lacquer which is obtained by polymerizing or copolymerizing comonomer(s) selected from acrylic acid, methacrylic acid and esters thereof and, optionally, another comonomer in solution polymerization or emulsion polymerization to prepare a varnish and, if necessary, adding a diluent, a second resin and the other additives, or a coating used as an enamel which is obtained by adding a pigment to the clear.

The polyester resin coating is such a coating as is hardened by allowing a vinyl compound or the like to act on an unsaturated polyester obtained by polycondensation of polyhydric alcohol with a polybasic acid. Example of the polyhydric alcohols employable herein include ethylene glycol, diethylene glycol, triethylene glycol and propylene glycol. Examples of the polybasic acids employable herein include phthalic anhydride, maleic anhydride, fumaric acid and adipic acid. Examples of the vinyl compounds employable herein include styrene and methacrylic acid. Of these, propylene glycol, phthalic anhydride and styrene are most frequently used.

The urethane resin coating is a coating which forms a coating film generally by a reaction between polyisocyanate and a polyol compound. The urethane resin coating includes one-pack type and two-pack type, and further includes a powder coating using blocked isocyanate.

The melamine resin coating is a thermoset coating and made by combining a butylated melamine resin, which has been etherified with butanol, with a phthalic acid resin or a butylated urea resin. As the phthalic acid resin, one having been modified with a non-drying oil such as castor oil or coconut oil or a semi-drying oil is generally employed.

The silicone resin coating is a coating using a curable silicone resin or a curable silicone resin having been modified with alkyd, epoxy, phenol, acrylic, melamine or urethane.

Of the above coatings, preferable are the acrylic resin coating, the melamine resin coating, the polyester resin coating, the urethane resin coating and the silicone resin coating, because the resulting coating films have excellent adhesion properties. Particularly preferable are the urethane resin coating and the silicone resin coating, because the resulting coating films have excellent adhesion properties.

Application of the coating can be performed by any of spraying, brushing and roller coating.

There is no specific limitation on the thickness of the coating film, and the thickness can be varied according to the intended use of the molded product. In general, the thickness is in the range of usually about 1 to 500 μm.

The crosslinked molded product having a surface decorative layer can be used for automobile industrial parts, such as weatherstrip, door glass run channel and window frame; and building materials, such as grazing gasket, joint gasket and air-tight gasket.

When the crosslinked molded product is used for weatherstrip sponge, it is preferable to use two kinds of α-olefins consisting of ethylene and α-olefin of 3 or more carbon atoms as the olefins in the unsaturated copolymer, and in this case, the molar ratio of ethylene to the another α-olefin (ethylene/another α-olefin) is in the range of preferably 80/20 to 60/40 (total: 100 mol).

Especially when the crosslinked molded product using the third unsaturated copolymer (unsaturated terpolymer) is used for weatherstrip sponge, it is preferable to use two kinds of α-olefins consisting of ethylene and α-olefin of 3 or more carbon atoms as the olefins in the third unsaturated copolymer in the above-mentioned molar ratio. When styrene is copolymerized as the aromatic vinyl compound, it is desirable that the styrene content is in the range of 1 to 7% by mol, preferably 2 to 6% by mol.

The intrinsic viscosity (η) of each of the unsaturated copolymers of the invention used for the weatherstrip sponge is preferably 2.5 to 4.5 dl/g. Further, sulfur crosslinking is preferable as the manner of crosslinking. If the ethylene/α-olefin molar ratio, the intrinsic viscosity (η) and the manner of crosslinking are the above-mentioned ones, excellent tensile strength, flexibility and compression set can be obtained.

It is preferable that the melt viscosity η* in the low-frequency region is as high as possible, because the compression set becomes low. For example, an unsaturated copolymer having a long-chain branch or an unsaturated copolymer containing a high-molecular weight component is preferable.

When the crosslinked molded product is used for the door glass run channel, it is preferable to use two kinds of α-olefins consisting of ethylene and α-olefin of 3 or more carbon atoms as the olefins in the unsaturated copolymer, and in this case, the molar ratio of ethylene to the another α-olefin (ethylene/another α-olefin) is preferably in the range of 90/10 to 75/25 (total: 100). In the use for the door glass run channel, further, the unsaturated copolymer preferably has an intrinsic viscosity (η) of 2.5 to 4.5 dl/g and an iodine value of 20 to 50. If the ethylene/α-olefin molar ratio, the intrinsic viscosity (η) and the iodine value are in the above ranges, strength, extensibility and hardness can be increased and compression set can be decreased.

The crosslinked molded product, particularly the crosslinked molded product using the third unsaturated copolymer, can be preferably used for tire tread.

When the crosslinked molded product is used for tire tread, it is preferable to use two kinds of α-olefins consisting of ethylene and an α-olefin of 3 or more carbon atoms as the olefins in the unsaturated copolymer (particularly preferably unsaturated terpolymer), and in this case, the molar ratio of ethylene to the α-olefin of 3 or more carbon atoms (ethylene/α-olefin of 3 or more carbon atoms) is desirably in the range of 99/1 to 75/25, preferably 85/15 to 75/25, more preferably 85/15 to 80/20. When styrene is copolymerized as the optionally used aromatic vinyl compound, it is desirable that the content of styrene units is in the range of 5 to 20% by mol, preferably 7 to 15% by mol. Further, it is preferable that the value of tan δ (0° C.) tends to be large and that the value of tan δ (50° C.) tends to be small.

If the unsaturated copolymers of the invention have the following properties, they can be used for shrink films.

That is, the unsaturated copolymers favorably used for shrink films comprise 99.89 to 58% by mol of constituent units derived from ethylene, 0 to 30% by mol of constituent units derived from an α-olefin of 3 to 12 carbon atoms, 0.1 to 12% by mol of constituent units derived from the optionally used aromatic vinyl compound and 0.01 to 10% by mol of constituent units derived from the conjugated diene (particularly butadiene or isoprene), and have an intrinsic viscosity (η) of 0.1 to 10 dl/g and a melting point of 60 to 125° C. In the use for the shrink film, further, it is preferable that the resulting film is stretched in at least one direction.

To the resin for the film, a tackifier is preferably added in an amount of 1 to 50 parts by weight based on 100 parts by weight of the unsaturated copolymer. Further, it is preferable that the resulting film is oriented in two directions and that the shrinkage ratio of the film at 80° C. is not less than 20%.

A composition comprising 0.5 to 100 parts by weight of an anti-fogging agent and optionally 0.5 to 10 parts by weight of a nucleating agent, based on 100 parts by weight of any of the unsaturated copolymers, is useful for films, sheets, tubes and hoses. Particular examples of such films and sheets include agricultural films, stretched films, wrapping films and packaging sheets.

Particular examples of the tubes include shrink tubes, piping tubes and medical tubes.

When the unsaturated copolymers are applied to the above uses, the melting point of the copolymers, as measured by DSC, is preferably in the range of 70 to 125° C.

In case of the above uses, it is preferable that in the unsaturated copolymers, the constituent units derived from ethylene are contained in an amount of 99.89 to 83% by mol, the constituent units derived from an α-olefin of 3 or more carbon atoms are contained in an amount of 0 to 10% by mol, the constituent units derived from the optionally used aromatic vinyl compound are contained in an amount of 0.1 to 7% by mol, and the constituent units derived from butadiene or isoprene are contained in an amount of 0.01 to 5% by mol.

Hot-melt Adhesive

When each of the unsaturated copolymers of the invention, particularly the third unsaturated copolymer (sometimes referred to as "unsaturated terpolymer" or "α-olefin/aromatic vinyl compound/conjugated diene copolymer"), is used to form the following composition, the composition is employable as a hot-melt adhesive.

That is, the hot-melt adhesive comprises (A) a base polymer, (B) a tackifier, (C) the above-described unsaturated copolymer, and optionally, (D) a low-molecular weight polyolefin.

The base polymer (A), the tackifier (B) and the low-molecular weight polyolefin (D) are described below.

(A) Base Polymer

There is no specific limitation on the base polymer employable in the invention, and polymers commonly used for hot-melt adhesives can be employed. Examples of such polymers include (a-1) a polyolefin, (a-2) a polar group-containing polymer and (a-3) an aromatic vinyl compound/conjugated diene copolymer.

(a-1) Polyolefns:

Examples of the polyolefins (a-1) include polyethylene (e.g., HDPE, LDPE, LLDPE) and polypropylene (e.g., atactic polypropylene, syndiotactic polypropylene) and an ethylene/propylene copolymer.

(a-2) Polar Group-containing Polymers:

Examples of the polar group-containing polymers (a-2) are given below.

(1) Ethylene/vinyl acetate copolymer (EVA)
(2) Modified EVA polymers, e.g., saponified EVA and graft modified EVA
(3) Ethylene/(meth)acrylate copolymers, e.g., ethylene/ethyl (meth)acrylate copolymer (EEA)
(4) Ionomer resins obtained by partially neutralizing ethylene/(meth)acrylic acid copolymers, such as Himilan (trade name, available from Mitsui Dupont Polychemical Co.)
(5) Ethylene/propylene/(meth)acrylic acid terpolymers
(6) Polyamides; reaction products of dibasic acids and diamines, e.g., reaction product of dimer acid (dimer of fatty acid from soybean oil, tung oil, tall oil or the like) and alkyldiamine such as ethylenediamine or diethylenetriamine, and nylons such as nylon 12. (Examples of the polyamides include Diamide (trade name, available from Daicel Kagaku Kogyo K.K.), Braticon (trade name, available from Toagosei Chemical Industry Co., Ltd.) and Amiran (trade name, available from Toray Industries, Inc.).)
(7) Polyesters, e.g., Ester Resin 200, 300 (trade names, available from Toyobo Co., Ltd.), Vital 200, 300 (trade names, available from Goodyear Tire & Rubber Co.)
(8) Vinyl acetate copolymer, vinyl acetate/crotonic acid copolymer, vinyl acetate/phthalic anhydride copolymer, vinyl acetate/vinyl pyrrolidone copolymer, cellulose derivative polymer, polymethyl methacrylate polymer, polyvinyl ether polymer, polyurethane polymer and thermosetting resin polymer (a-3) Aromatic Vinyl Compound/conjugated Diene Copolymer:

The aromatic vinyl compound/conjugated diene copolymer (a-3) is a copolymer comprising an aromatic vinyl compound and a conjugated diene compound or its hydrogenated product. Examples of such copolymers and their hydrogenated products include styrene/butadiene random copolymer, styrene/isoprene random copolymer, butadiene/polystyrene block copolymer, polystyrene/polyisoprene block copolymer, polystyrene/polyisoprene/polystyrene triblock copolymer (SIS), polystyrene/polybutadiene/polystyrene triblock copolymer (SBS), poly(α-methylstyrene)/polybutadiene/poly(α-methylstyrene) triblock copolymer, and hydrogenated products of these copolymers. These polymers are commercially available, and examples thereof include Kaliflex TR-1101, TR-1107, TR-4113 (trade names, available from Shell Chemical Co.), Kraton G-6500, G-6521, G-1650, G-1652, G-1657 (trade names, available from Shell Chemical Co.), and Sorprene, Hydrogenated Sorprene (trade names, available from Philips Co.).

In the hot-melt adhesive, the above-mentioned base polymers can be used singly or in combination of two or more kinds. of the base polymers, preferable are aromatic vinyl compoundjconjugated diene copolymers and their hydrogenated products, and particularly preferable are aromatic vinyl compound/conjugated diene copolymers.

(B) Tackifier

The tackifier (B) used for the hot-melt adhesive functions to adjust melt viscosity of the base polymer (A) and to improve hot tack and wetting properties thereof. There is no specific limitation on the tackifier (B), as far as it can improve hot tack and wetting properties of the base polymer (A) during the application of heat. Examples of the tackifiers (B) employable herein include those previously described.

(D) Low-molecular Weight Polyolefin

The low-molecular weight polyolefin (D) optionally used for forming the hot-melt adhesive is:

(i) a polyolefin which is a homopolymer of an α-olefin of 2 to 12 carbon atoms or a copolymer of two or more kinds of the α-olefins and has an intrinsic viscosity ($\eta$) of 0.01 to 0.6 dl/g, or (ii) a saturated straight-chain or branched hydrocarbon having an intrinsic viscosity ($\eta$) of 0.01 to 0.6 dl/g.

Examples of the α-olefins of 2 to 12 carbon atoms in the polyolefin (i) include those previously described.

The polyolefin (i) can be prepared in accordance with known processes. For example, the polyolefin (i) can be prepared by a high-pressure radical polymerization process, or a medium-pressure or low-pressure polymerization process conducted in the presence of a transition metal compound catalyst such as Ziegler catalyst. The polyolefin (i) may be prepared by a thermal decomposition process comprising first preparing a high-molecular weight homopolymer or copolymer by the above polymerization process and then subjecting the high-molecular weight homopolymer or copolymer to thermal degradation or radical degradation using a peroxide to make it low-molecular-weight.

Examples of the hydrocarbons (ii) include straight-chain hydrocarbons, such as paraffin wax and sazole wax; and branched hydrocarbons, such as micro wax. These waxes are generally known and commercially available. Of the waxes, the sazole wax can be prepared by the following process.

Coal is gasified using steam and oxygen to obtain a synthetic gas mainly composed of carbon monoxide and hydrogen. The synthetic gas is passed through a fixed bed catalyst reactor known as a reactor of ARGE process to obtain a reaction product, whose components heavier than Diesel engine oil are fractionated into a first fraction (C18 to C23), a second fraction (C22 to C36) and a third fraction (C33 or higher) by means of vacuum distillation. Of the fractions, the third fraction is hydrogenated to remove all of unsaturated hydrocarbons and oxygen compounds, whereby sazole wax is obtained.

The hot-melt adhesive is made from the base polymer (A), the tackifier (B) and the unsaturated copolymer (C) (preferably α-olefin/aromatic vinyl compound/conjugated diene copolymer, i.e., unsaturated terpolymer), and comprises:

(A) the base polymer in an amount of 100 parts by weight,
(B) the tackifier in an amount of 10 to 30 parts by weight, preferably 50 to 200 parts by weight, and
(C) the unsaturated copolymer in an amount of 10 to 400 parts by weight, preferably 30 to 300 parts by weight.

To the hot-melt adhesive, the low-molecular weight polyolefin (D) can be added in an amount of 1 to 100 parts by weight, preferably 10 to 80 parts by weight, based on 100 parts by weight of the base polymer (A). If the low-molecular weight polyolefin (D) is added, the melt viscosity of the hot-melt adhesive can be decreased to improve workability. When the low-molecular weight polyolefin (D) is added, the intrinsic viscosity (η) of the unsaturated copolymer (C) is preferably more than 0.6 dl/g and not more than 10 dl/g.

The hot-melt adhesive may optionally contain various additives such as softener, stabilizer, filler and antioxidant in amounts not detrimental to the objects of the present invention, in addition to the base polymer (A), the tackifier (B), the unsaturated copolymer (C) and the low-molecular weight pdlyolefin (D).

The hot-melt adhesive can be prepared by a hitherto known process. For example, the base polymer (A), the tackifier (B), the unsaturated copolymer (C), and optionally, the low-molecular weight polyolefin (D) and the additives in the prescribed amounts are fed to a mixing machine such as a Brabender mill, then heated, melt mixed and molded into a desired shape such as a shape of particle, flake or bar.

In the use of the hot-melt adhesive, the hot-melt adhesive is melted and applied to various materials such as cloth, kraft paper, metal foil (e.g., aluminum foil) or resin molded product (e.g., polyester film) in a conventional manner to form an adhesive layer. The hot-melt adhesive exhibits excellent adhesion properties also when a styrene polymer and a polyolefin are combined.

Latex Composition

Each of the unsaturated copolymers of the invention can be used also in the form of a latex composition.

The latex composition can be prepared by homogeneously dispersing 100 parts by weight of (A) the unsaturated copolymer and 2 to 50 parts by weight of (B) at least one low-molecular weight polymer selected from the group consisting of low-molecular weight polyethylene, a low-molecular weight ethylene/α-olefin copolymer, an unsaturated carboxylic acid compound-modified low-molecular weight polyethylene and an unsaturated carboxylic acid compound-modified low-molecular ethylene/α-olefin copolymer, in an aqueous medium in the presence of a surface active agent.

The solid component of the latex composition desirably has a mean particle diameter of 0.1 to 3.0 μm. It is preferable that the solid component have crosslinkage and that the content of hot toluene-insoluble matter be not less than 30% by weight.

The low-molecular weight polymer can be a polymer which is waxy or liquid at ordinary temperature.

The low-molecular weight polyethylene is, for example, polyethylene wax. The low-molecular weight polyethylene preferably has an intrinsic viscosity (η), as measured in decalin at 135° C., of 0.01 to 0.3 dl/g.

Examples of the low-molecular weight ethylene/α-olefin copolymers include ethylene/(α-olefin copolymers, such as an ethylene/propylene copolymer and an ethylene/1-butene copolymer. The low-molecular weight ethylene/α-olefin copolymer preferably has an intrinsic viscosity (η), as measured in decalin at 135° C., of 0.01 to 0.3 dl/g.

The unsaturated carboxylic acid compound-modified low-molecular weight polyethylene and the unsaturated carboxylic acid compound-modified low-molecular weight ethylene/α-olefin copolymer are the low-molecular weight polyethylene and low-molecular weight ethylene/α-olefin copolymer which contain an unsaturated carboxylic acid as a comonomer or are graft-modified with an unsaturated carboxylic acid.

Examples of the unsaturated carboxylic acid compounds include unsaturated carboxylic acids of 3 to carbon atoms, and anhydrides, amides, imides and esters of the unsaturated carboxylic acids. Specifically, there can be mentioned unsaturated carboxylic acids, such as acrylic acid, methacrylic acid, maleic acid, fumaric acid, itaconic acid, citraconic acid, norbornenedicarboxylic acid, tetrahydrophthalic acid and bicyclo[2.2.1]hept-2-ene-5,6-dicarboxylic acid; unsaturated carboxylic anhydrides, such as maleic anhydride, itaconic anhydride, citraconic anhydride, tetrahydrophthalic anhydride and bicyclo[2.2.1]hept-2-ene-5,6-dicarboxylic anhydride; unsaturated carboxylic acid amides or imides, such as maleic acid monoamide, maleic acid diamide and maleimide; and unsaturated carboxylic esters, such as methyl acrylate, methyl methacrylate, dimethyl maleate, monomethyl maleate, diethyl maleate, diethyl fumarate, dimethyl itaconate, diethyl citraconate, dimethyl tetrahydrophthalate, dimethyl bicyclo[2.2.1]hept-2-ene-5,6-dicarboxylate and glycidyl (meth)acrylate.

Of these, preferable are maleic acid, maleic anhydride, maleic acid monoamide, maleic acid diamide, maleimide, monomethyl maleate, diethyl maleate and glycidyl (meth) acrylate.

In the low-molecular weight polyethylene and the low-molecular weight ethylene/α-olefin copolymer in each of which the unsaturated carboxylic acid compound is copolymerized, and in the low-molecular weight polyethylene and the low-molecular weight ethylene/α-olefin copolymer each of which is graft modified with the unsaturated carboxylic acid compound, the constituent units derived from the unsaturated carboxylic acid compound are desirably contained in an amount of 0.2 to 50% by weight, preferably 0.2 to 30% by weight.

The low-molecular weight polyethylene and the low-molecular weight ethylene/α-olefin copolymer in each of which the unsaturated carboxylic acid compound is copolymerized and the low-molecular weight polyethylene and the low-molecular weight ethylene/α-olefin copolymer each of which is graft modified with the unsaturated carboxylic acid compound preferably have an intrinsic viscosity (η), as measured in decalin at 135° C., of 0.01 to 0.3 dl/g.

The low-molecular weight polymers (B) mentioned above can be used singly or in combination of two or more kinds.

The low-molecular weight polymer (B) has a function of finely dividing the unsaturated copolymer (A) in the preparation of the copolymer latex composition (sometimes referred to as "latex composition" simply hereinafter).

The copolymer latex composition contains the unsaturated copolymer (A) as a solid component. The copolymer latex composition also contains the low-molecular weight polymer (B). The low-molecular weight polymer (B) is desirably contained in an amount of 2 to 50 parts by weight, preferably 5 to 40 parts by weight, based on 100 parts by weight of the unsaturated copolymer (A). When the low-molecular weight polymer (B) is contained in this amount, the solid component can be finely divided and the resulting copolymer latex composition shows excellent storage stability. Besides, the impact resistance can be improved when the latex composition is used as a resin modifier.

The copolymer latex composition can be prepared by homogeneously dispersing the unsaturated copolymer (A) and optionally the low-molecular weight polymer (B) in an aqueous solvent in the presence of a surface active agent. In more detail, the unsaturated copolymer (A), a hydrocarbon solvent such as hexane and the low-molecular weight polymer (B) are mixed and stirred to give a homogeneous solution. Then, the homogeneous solution is added to an aqueous medium dispersion of a surface active agent, and they are mixed and stirred to obtain an emulsion. The emulsion is heated at a temperature of 50 to 100° C. to remove the organic solvent by volatilization, whereby a copolymer latex composition is obtained.

In the above process, the aqueous medium is preferably used in such an amount that the concentration of the solid component in the resulting copolymer latex composition becomes 5 to 65% by weight. When the aqueous medium is used in this amount, the resulting copolymer latex composition has good handling properties.

There is no specific limitation on the surface active agent, and any of anionic surface active agents, cationic surface active agents and nonionic surface active agents are employable. In the present invention, preferably used are the anionic surface active agents, and particularly preferably used are metallic salts of fatty acids such as fatty acid sodium salt and fatty acid potassium salt. Though the amount of the surface active agent varies depending upon the type of the polymer component used, the surface active agent is used in an amount of usually 0.2 to 20 parts by weight, preferably 0.5 to 10 parts by weight, based on 100 parts by weight of the unsaturated copolymer (A).

The copolymer latex composition can be prepared by such phase reversal of emulsion under high shearing using a twin-screw extruder as described in Japanese Patent Laid-Open Publication No. 123664/1986.

The mean particle diameter of the solid component of the copolymer latex composition obtained as above is desirably in the range of 0.1 to 3.0 μm.

The copolymer latex composition obtained above may be subjected to crosslinking treatment. The crosslinking treatment can be carried out by a known method such as ionizing radiation-induced crosslinking or organic peroxide crosslinking.

Examples of ionizing radiation used for the ionizing radiation-induced crosslinking include α rays, β rays, γ rays, electron rays and X rays. The irradiation dose of the ionizing radiation is preferably in the range of 1 to 50 Mrad. In the ionizing radiation-induced crosslinking, a polyfunctional monomer may be added to the copolymer latex composition. As the polyfunctional monomer, a monomer having two or more ethylenically unsaturated groups, particularly vinyl groups, is preferably employed. Examples of such monomers include divinylbenzene, tetramethylene diacrylate, glyceryl triacrylate, ethylene glycol dimethacrylate, 1,2,4-trivinylcyclohexane and tetraallyloxyethane. The polyfunctional monomer is used in an amount of usually 0.1 to 20 parts by weight, preferably 0.3 to 5 parts by weight, based on 100 parts by weight of the unsaturated copolymer (A).

The organic peroxide crosslinking is carried out by homogeneously dispersing an organic peroxide in the copolymer latex composition and heating the dispersion at a temperature not lower than the decomposition temperature of the organic peroxide. As the organic peroxide, an organic peroxide having a temperature, at which its half-life period corresponds to 10 hours, of 0 to 100° C. is preferably employed. Examples of such organic peroxides include 1,1-bis(t-butylperoxy)cyclohexane, t-butyl peroxypivalate, t-butyl peroxy-2-ethylhexanoate, t-butyl peroxyisopropyl carbonate, 2,5-dimethyl-2,5-di(benzoylperoxy)hexane, 3,5,5-tirmethylhexanoyl peroxide, benzoyl peroxide, p-chlorobenzoyl peroxide, 2,4-dichlorobenzoyl peroxide, isobutyl peroxide, diisobutyl peroxydicarbonate and di(2-ethylhexyl) peroxycarbonate. These organic peroxides can be used singly or in combination of two or more kinds. The organic peroxide is used in an amount of usually 0.3 to 20 parts by weight, preferably 1 to 10 parts by weight, based on 100 parts by weight of the unsaturated copolymer (A).

In the organic peroxide crosslinking, a polyfunctional monomer may be added to the copolymer latex composition. Examples of the polyfunctional monomers include those previously described. The polyfunctional monomer is used in an amount of usually 0.1 to 20 parts by weight, preferably 0.3 to 5 parts by weight, based on 100 parts by weight of the unsaturated copolymer (A).

The organic peroxide crosslinking may be carried out at normal pressure or under application of pressure, but it is desirable that the crosslinking conditions are set so that the content of the hot toluene-insoluble matter as the solid component becomes not less than 30% by weight, preferably not less than 50% by weight, more preferably not less than 60% by weight. Concretely, the heating period is preferably adjusted to 5 to 7 times of the half life period. The content of the hot toluene-insoluble matter in the solid component is an indication of degree of crosslinking, and if the content of the hot toluene-insoluble matter is in the above range, the impact resistance can be improved when the crosslinked copolymer latex composition is used as a resin modifier.

The mean particle diameter of the solid component of the crosslinked copolymer latex composition obtained above is desirably in the range of 0.1 to 3.0 μm. The crosslinked copolymer latex composition of the invention has excellent storage stability, and when the latex composition is used as a resin modifier, the impact resistance and the surface gloss of the resin can be improved.

To the crosslinked copolymer latex composition of the invention, various known additives such as pigment, thickening agent, plasticizer, antiseptic agent, anti-foaming agent, pH adjuster, antioxidant and anti-aging agent may be added in the hitherto known amounts according to the intended use. These additives may be added to the copolymer latex composition prior to the crosslinking treatment.

The (crosslinked) copolymer latex composition of the invention can be used as a modifier for thermoplastic resins such as acrylonitrile/styrene copolymer (AS resin) and modified polyphenylene oxide (modified PPO resin). In this case, the (crosslinked) copolymer latex composition is used after dried. Further, a reaction product obtained by graft polymerizing acrylonitrile or the like in the presence of the (crosslinked) copolymer latex composition can be used as a resin modifier.

The AS resin and the modified PPO resin both having been modified with the (crosslinked) copolymer latex composition of the invention are excellent in weathering resistance, solvent resistance, impact resistance and surface gloss, and they are used for housings of electrical appliances, automobile interior trims such as inner panel, and automobile exterior trims such as front grille.

The crosslinked product of the invention, particularly the organic peroxide-crosslinked product, is especially useful for films or sheets, which have good balance among transparency, scratch resistance, heat resistance and flexibility. When the crosslinked product is used for films, a copolymer obtained by copolymerizing ethylene, a conjugated diene, and optionally, at least one component selected from an α-olefin of 3 or more carbon atoms and an aromatic vinyl compound is preferable. This copolymer is identical with the aforesaid copolymer. From the viewpoint of heat resistance, it is desirable to use a copolymer having a melting point, as measured by DSC, of not lower than 40° C., preferably not lower than 70° C. The films or sheets can be used for decorative films, tablecloths, book covers and the like. The thickness of the films or sheets are not particularly limited, but are generally in the range of from 1 μm to 110 mm. It is preferred that the films or sheets be transparent. The crosslinked prodcut has a Haze value of 0 to 50%, more preferably 0 to 30% (of 1 mm thick), when used as a film or sheet.

Especially when the unsaturated copolymer used in the crosslinked product of the invention is the third unsaturated copolymer containing an aromatic vinyl compound, the crosslinked product is favorably used for freezer bags, decorative films, tablecloths and book covers in the form of films or sheets, and for medical instruments in the form of tubes. Moreover, the crosslinked product is favorably applied to the same uses as those of "soft vinyl chloride resin", such as food containers, stationery, daily necessaries (e.g., cleaner bumper, cutting mat, bath cover, transfusion set) and automobile interior trims.

EFFECT OF THE INVENTION

According to the invention, there are provided unsaturated copolymers which are excellent in weathering resistance, heat resistance and oil resistance, are economically advantageous, have low glass transition temperature and thereby show excellent low-temperature resistance, have excellent crosslinking efficiency and modification efficiency especially in the organic peroxide crosslinking, are capable of being crosslinked with sulfur, and are capable of being industrially produced at low cost and economically efficiently.

According to the invention, further, there are provided processes capable of producing unsaturated copolymers having the above-mentioned excellent properties.

EXAMPLE

Hereinafter, the present invention will be further described in more detail with reference to the following non-limiting examples.

Physical property's tests are carried out in the following conditions.
Ozone Resistance Test The ozone resistance test is a static test that is carried out in an ozone testing bath at 40° C. for 96 hours in a condition such that the ozone concentration is 80 ppm and a rate of elongation is 80%. The evaluation of ozone resistance is carried out by evaluating deteriorating conditions in a surface in accordance with the standard of JIS K 6301. The standard of evaluating the surface conditions is as follows, and for example, it is indicated by "C-5".
Number of Cracks
  A . . . a few cracks
  B . . . many cracks
  C . . . numerous cracks
Size and Depth of Crack
  1 . . . Cracks are not confirmed with the naked eye, but are confirmed with a 10-power magnifier.
  2 . . . Cracks are confirmed with the naked eye.
  3 . . . Cracks are deep and have a comparatively large size of less than 1 mm.
  4 . . . Cracks are deep and have a large size of from not less than 1 mm to less than 3 mm.
  5 . . . Cracks have a size of not less than 3 mm and are on the point of breakage.
Tear Test With respect to the tear test, a 20 mm wide Teflon sheet is interposed between two non-vulcanized rubber sheets, and subjected to press vulcanization. Thereafter the part where the Teflon sheet is interposed is chucked and stretched. Then, peeling strength is measured.
Oil Resistance Test The oil resistance test is carried out in accordance with an immersion test defined in JIS K 6301 and a volume change of a test piece (ΔV %) is measured. A JIS No. 3 oil is used as a testing oil and the test is carried out at 100° C. for 72 hr.
Tensile Test In accordance with JIS K 6301, tensile strength (TB), elongation at break (EB) and permanent elongation set (PS) are measured.
Hardness Test In accordance with JIS K 6301, JIS A hardness (HS) is measured.
Compression Permanent Set Compression permanent set (CS) (Compression conditions: 150° C., 22 hr.) which is an index of a cross-linking density is measured by a method indicated in JIS K 6301.
Rubber Properties The rubber properties are evaluated by the following testing methods. That is, strength properties are evaluated by tensile strength (TB), abrasion resistance is evaluated by the Lambourn method, braking properties in a wet and moist surface (wet skid) are evaluated by tan δ at 0° C. in a spectrometer and rolling resistance is evaluated by tan δ at 50° C. in the spectrometer.
Melting Point (Tm) and Glass Transition Temperature (Tg)

An endothermic curve is measured with DSC and a temperature at the maximum peak is taken as a melting point (Tm).

The measurement is carried out as follows. A specimen is put in an aluminum pan, and the temperature is raised to 200° C. at a rate of 10° C./min. and kept at 200° C. for 5 min. Thereafter it is descended to −150° C. at a rate of 20° C./min. Furthermore, when it is raised at a rate of 10° C./min, Tm is determined by an endothermic curve.

From the endothermic peak in measurement with DSC, a heat of fusion per unit weight is measured, and a crystallinity (%) is determined by dividing the heat of fusion by 70 cal/g of the heat of fusion of crystalline polyethylene.
Intrinsic Viscosity (η)

An intrinsic viscosity is measured in decalin at 135° C.
Mw/Mn

Mw/Mn is measured using GPC (Gel permeation chromatography) in an ortho-dichlorobenzene solvent at 140° C.
Testing Method
  (1) Tensile strength (TB) is measured in accordance with JIS K 6301.
  (2) Lanbourn abrasion is measured with a Lanbourn abrasion tester (manufactured by Iwamoto Seisakusho Co.) in the following conditions. Measuring conditions:
    Load: 3 Kg
    Peripheral speed of a sample: 150 m/min.
    Peripheral speed of a grinder: 100 m/min.
  (3) tan δ is measured using a dynamic spectrometer (manufactured by Leometrix Co.) in the following conditions.

Measuring Conditions

| | |
|---|---|
| Shear deformation rate | 0.5% |
| Frequency | 15 Hz |

EXAMPLE A1

Pre-activation of Catalyst

In a glass vessel thoroughly replaced with nitrogen, 5.5 mg of (dimethyl(t-butylamide)(tetramethyl-$\eta^5$-cyclopentadienyl)silane)dichloride titanium synthesized by a known method was weighed. 0.75 ml of a 1.0 mmol/ml toluene solution of tri-isobutylaluminum (abbreviated to TIBA hereinafter), which was equal to 0.75 mmol of aluminum atom, was added to the vessel. Then the mixture was irradiated with ultrasonic waves at 23° C. for 15 min, to prepare a catalyst solution.

Synthesis of Ethylene/butadiene Copolymer

To a 2 l autoclave dried under reduced pressure and replaced with nitrogen, 288 ml of toluene and 0.075 ml of the catalyst solution prepared in the above step of pre-activating catalysts were added at ordinary temperature, and ethylene was fed with stirring to elevate the pressure to 6 Kg/cm$^2$ G. Thereafter the pressure of the autoclave was released. The pressuring and releasing procedure was repeated 3 times.

Thereafter, 7 g of a 1,3-butadiene gas was introduced in the presence of ethylene under ordinary pressure and the temperature of the autoclave was raised to 50° C. Then the system was pressured with ethylene to 6 Kg/cm$^2$ G. 1.5 ml of a toluene solution of triphenyl carbenium tetra (pentafluorophenyl)borate (0.002 mM/ml) was added, and copolymerization of ethylene with 1,3-butadiene was initiated. In the copolymerization, the catalyst concentration of (dimethyl(t-butylamide)(tetramethyl-$\eta^5$-cyclopentadienyl)silane) dichloride titanium was 0.005 mmol/l and that of triphenylcarbenium tetra (pentafluorophenyl)borate was 0.01 nmmol/l per the whole system. During the polymerization, the inner pressure was kept at 6 Kg/cm$^2$ G by feeding ethylene continuously. After 5 minutes, the polymerization reaction was stopped by adding methyl alcohol.

After releasing the pressure, a polymer solution was taken out and washed with the same amount of a water solution prepared by adding 5 ml of concentrated hydrochloric acid to 1 l of water, so that the catalyst residue was transferred to a water phase.

The contact mixed solution was allowed to stand and the water phase was separated and removed. Furthermore, the polymerization liquid phase was washed twice with a distilled water, to divide into oil and water. Subsequently, the oil and water separated polymerization liquid phase was brought to contact with 3 times the amount of acetone with vigorously stirring, to precipitate a polymer. The polymer was thoroughly washed with acetone and filtered, to collect a solid part (copolymer). The copolymer was dried in a stream of nitrogen at 130° C. at 350 mmHg for 12 hr.

The yield of the ethylene/butadiene copolymer thus prepared was 13 g, the intrinsic viscosity [$\eta$], as measured in Decalin (a trademark for decahydronaphthalene) at 135° C., of 3.5 dl/g, the glass transition temperature Tg was −39° C., the iodine value was 31 g/100 g, the ethylene content was 96 mol %, the 5-membered ring structure was 2.4 mol %, the 3-membered ring structure was 0.1 mol %, the 1,2-addition structure was 0.4 mol %, the 1,4-addition structure was 1.1 mol % and the activity was 104 Kg/mmolZr·hr.

The results are shown in Table 4.

EXAMPLE A2

The procedure of Example A1 was repeated except that the amount of 1,3-butadiene was changed to 10 g. The yield of the resulting ethylene/butadiene copolymer was 14 g, the intrinsic viscosity [$\eta$], as measured in decalin at 135° C. was 4.0 dl/g, the glass transition temperature Tg was −38° C., the iodine value was 40 g/100 g, the ethylene content was 91 mol %, the 5-membered ring structure was 6.8 mol %, the cyclopropane ring structure was 0.1 mol %, the 1,2-addition structure was 0.6 mol %, the 1,4-addition structure was 1.5 mol % and the activity was 112 Kg/mmolZr·hr.

The results are shown in Table 4.

EXAMPLE A3

The procedure of Example A1 was repeated except that the amount of 1,3-butadiene was changed to 4 g. The yield of the resulting ethylene/butadiene copolymer was 15 g, the intrinsic viscosity [$\eta$], as measured in decalin at 135° C. was 4.2 dl/g, the glass transition temperature Tg was −40° C., the iodine value was 21 g/100 g, the ethylene content was 97 mol %, the 5-member ring structure of 1.9 mol %, the cyclopropane ring structure was 0.1 mol %, the 1,2-addition structure was 0.4 mol %, the 1,4-addition structure was 0.6 mol % and the activity was 120 Kg/mmolZr·hr.

The results are shown in Table 4.

EXAMPLE A4

The procedure of Example A1 was repeated except that 5500 ml of propylene (25° C., 1 atmospheric pressure) was additionally introduced, the amount of 1,3-butadiene was changed to 4 g and the reaction temperature was changed to 20° C. The yield of the resulting ethylene/propylene/butadiene copolymer was 1.7 g, the intrinsic viscosity [$\eta$], as measured in decalin at 135° C. was 1.7 dl/g, the glass transition temperature Tg was −45° C., the iodine value was 18.1 g/100 g, the ethylene content was 67.5 mol %, the content of propylene was 24.9 mol %, the 5-membered ring structure was 5.0 mol %, the cyclopropane ring structure was 0.1 mol %, the 1,2-addition structure was 0.5 mol %, the 1,4-addition structure was 2.0 mol % and the activity was 13 Kg/mmolZr·hr.

The results are shown in Table 4.

TABLE 4

| | Example | | | |
|---|---|---|---|---|
| Constituting unit (mol %) | A1 E/BD | A2 E/BD | A3 E/BD | A4 E/P/BD |
| 1,2-adduct | 0.4 | 0.6 | 0.4 | 0.5 |
| 3,4-adduct | | | | |
| 1,4-adduct | 1.1 | 1.5 | 0.6 | 2.0 |
| 5-membered ring (cyclopentane ring) | 2.4 | 6.8 | 1.9 | 5.0 |
| 3-membered ring (cyclopropane ring) | 0.1 | 0.1 | 0.1 | 0.1 |
| Ethylene unit | 96 | 91 | 97 | 67.5 |
| Propylene unit | | | | 24.9 |
| Styrene unit | | | | |
| Tg (° C.) | −39 | −38 | −40 | −45 |

TABLE 4-continued

|  | Example | | | |
|---|---|---|---|---|
| Constituting unit (mol %) | A1 E/BD | A2 E/BD | A3 E/BD | A4 E/P/BD |
| Tm (° C.) | 95 | 70 | 100 | — |
| Intrinsic viscosity [η] (dl/g) | 3.5 | 4.0 | 4.2 | 1.7 |
| Iodine value IV (g/100 g) | 31 | 40 | 21 | 18 |
| Catalyst activity (Kg/mmolZr · hr) | 104 | 112 | 120 | 13 |
| Mw/Mn | 2.3 | 2.4 | 2.3 | 2.4 |

E: ethylene, BD: 1,3-butadiene, P: propylene

EXAMPLE A5

In a 200 ml glass autoclave thoroughly replaced with nitrogen, 38 ml of toluene and 6 g of the ethylene/propylene/1,3-butadiene copolymer prepared in Example A4 were put and the temperature was raised to 140° C. with stirring of the mixture. In another vessel, 1.06 g of maleic anhydride and 0.18 g of dicumyl peroxide were dissolved in 8 ml of toluene, to prepare a solution. The solution was added dropwise to the autoclave over 3.5 hr at a uniform rate, and then stirred for 30 min. During the dropping, the temperature was gradually raised to 160° C. After completion of the reaction, the reaction solution was cooled to 70° C. and added to 200 ml of methanol, to precipitate a polymer. The precipitated polymer was further washed with 200 ml of acetone and dried in vacuum at 130° C. for 12 hr, to prepare a graft modified ethylene/propylene/1,3-butadiene copolymer. In the resulting modified polymer, 3.5 wt % of maleic anhydride was modified. The intrinsic viscosity of the modified polymer, as measured in decalin at 135° C. was 1.8 dl/g.

EXAMPLE A6

Production of Vulcanized Rubber

The copolymer prepared in Example A4, zinc white, stearic acid, HAF carbon black (HAF Asahi #70™ manufactured by Asahi Carbon Co.) and dicumylperoxide (DCP-40C) were added in the following amounts and kneaded in an open roll (front roll/back roll: 50/60° C., 16/18 rpm), to prepare an unvulcanized compounded rubber.

Compounding Composition

| Copolymer prepared in Example A4 | 100 parts by weight |
|---|---|
| Zinc white | 5 parts by weight |
| Stearic acid | 1 parts by weight |
| HAF carbon black | 50 parts by weight |
| Dicumyl peroxide (DCP-40C) | 7 parts by weight |

The unvulcanized compounded rubber thus prepared was heated for 15 min. by a press heated at 170° C., to prepare a vulcanized sheet. Then, the resultant sheet was subjected to the tensile, hardness and compression permanent set tests in the above described conditions.

The tensile strength TB(MPa) was 18, the elongation EB(%) was 200, the hardness HS(JIS A) was 72 and the compression permanent set CS(%) was 13.

The results are shown in Table 5.

COMPARATIVE EXAMPLE A1

The procedure of Example A6 was repeated except that the copolymer prepared in Example A4 (4 in Table 4) was not used and an ethylene/propylene/5-ethylidene-2-norbornene copolymer rubber (ethylene:propylene=73:27 (molar ratio), Iodine value=18 g/100 g, [η]=1.85) was used.

The tensile strength TB(MPa) was 18, the elongation EB(%) was 230, the hardness HS(JIS A) was 69 and the compression permanent set CS(%) was 20.

The results are shown in Table 5.

TABLE 5

| Vulcanization properties | Example A6 | Comparative Example A1 |
|---|---|---|
| TB (MPa) | 18 | 18 |
| EB (%) | 200 | 230 |
| HS (JIS A) | 72 | 69 |
| CS (%) | 13 | 20 |

EXAMPLE A7

The procedure of Example A1 was repeated except that 4400 ml of propylene (25° C., 1 atmospheric pressure) was additionally introduced and the amount of 1,3-butadiene, the amount of the catalyst solution, the reaction time and the reaction temperature were changed to 7 g, 0.045 ml, 15 min. and 20° C., respectively. The yield of the resulting ethylene/propylene/butadiene copolymer was 2.9 g, the intrinsic viscosity [η], as measured in decalin at 135° C. was 2.5 dl/g, the glass transition temperature Tg was –43° C., the iodine value (I.V.) was 25.1 g/100 g, the ethylene content was 71.4 mol %, the propylene content was 20.1 mol %, the 5-membered ring structure was 5.3 mol %, the cyclopropane ring structure was 0.2 mol %, the 1,2-addition structure was 0.7 mol %. the 1,4-addition structure was 2.3 mol % and the activity was 13 Kg/mmolZr·hr.

EXAMPLE A8

Production of Vulcanized Rubber

The copolymer prepared in Example A7, zinc white, stearic acid, HAF carbon black (HAF Asahi #70™ manufactured in Asahi Carbon Co.) and dicumylperoxide (DCP-40C) were added in the following amounts and kneaded in an open roll (front roll/back roll: 50/60° C., 16/18 rpm), to prepare an unvulcanized compounded rubber.

Compounding Composition

| Copolymer | 100 parts by weight |
|---|---|
| Zinc white | 5 parts by weight |
| Stearic acid | 1 parts by weight |
| HAF carbon black | 50 parts by weight |
| DCP-40C | 7 parts by weight |

The unvulcanized compounded rubber thus prepared was heated for 15 min. by a press heated at 170° C., to prepare a vulcanized sheet. Then, the following tests were carried out.

The results are shown in Table 6.

The sheet was suitable for using as a glass run channel.

Furthermore, by adjusting the roll nip to 1 mm, the unvulcanized rubber was separately taken out and subjected to cross-linking for 10 min. in an oven heated at 220° C. Then, surface tackiness was observed.

The results are shown in Table 6.

TABLE 6

| Physical properties | |
|---|---|
| TB (MPa) | 22 |
| EB (%) | 210 |
| HS (JIS A) | 75 |
| CS (%) | 11 |
| Surface tackiness | none |

EXAMPLE A9

70 parts by weight of the unsaturated copolymer rubber prepared in Example A4 and 30 parts by weight of polypropylene (PP, J700™, manufactured by Mitsui Chemicals Inc.) were kneaded at 180° C. for 5 min. in a nitrogen atmosphere with a Banbury mixer. Then, the kneadate was passed through a roll, to make it to a sheet. Subsequently, it was cut with a sheet cutter, to prepare square pellets.

To 100 parts by weight of the square pellets, 0.1 part by weight of divinylbenzene (hereinafter referred to as DVB) and 0.15 part by weight of 2,5-dimethyl-2,5-(tert-butylperoxy)hexane (hereinafter referred to as POX) were blended and mixed with stirring in a Henschel mixer.

Subsequently, the mixture was kneaded at 200° C. for 5 min. in a nitrogen atmosphere with a labo plastomill (model 20R200, manufactured by Toyoseiki Seisakujo) at 100 rpm, to prepare an olefin thermoplastic elastomer composition.

The resulting olefin thermoplastic elastomer composition was molded with a press heated at 200° C., to prepare a 2×80×80 mm square plate.

Oil Resistance Test

From the resulting square plate, a 2×10×10 mm test piece was punched out and an initial volume (VO) of the test piece was measured using a water-immersion volume measuring apparatus.

The test piece was immersed in a JIS No. 1 oil heated at 70° C. for 3 days, and thereafter the temperature was returned to room temperature and a volume (V) of the test piece after swelling was measured in the same manner. From these values, a degree of swelling (ΔV) was measured using the following formula:

ΔV(%)={(V−VO)/VO}×100

In result, the degree of swelling (ΔV) was 98(%).

COMPARATIVE EXAMPLE 2

The evaluating procedure of Example A9 was repeated by using ENB-EPT copolymer (an ethylene/propylene/ethylidene norbornene terpolymer) having a composition ratio of ethylene/propylene/ENB (ethylidene norbornene) of 68.3/29.3/2.4 (mole), an intrinsic viscosity [η] of 1.8 dl/g and an iodine value of 18 g/100 g.

In result, the degree of swelling (ΔV) was 121 (%).

EXAMPLE B1

Pre-activation of Catalyst

In a glass vessel thoroughly replaced with nitrogen, 16.0 mg of isopropylidene bisindenylzirconium dichloride synthesized in a known process was weighed. 15.2 ml of a 1.484 mmol/ml toluene solution of methylalumoxane (hereinafter abbreviated to MAO), which was equal to 22.57 mmol of aluminum atom, was added to the vessel. Then, the mixture was irradiated with ultrasonic waves at 23° C. for 15 min, to prepare a catalyst solution.

Synthesis of Ethylene/isoprene Copolymer

To a 2 l autoclave dried under reduced pressure and replaced with nitrogen, 177.2 ml of toluene and 117.5 ml of isoprene were added at ordinary temperature. Then, 0.3 ml of a 1.0 mmol/ml toluene solution of triisobutyl aluminum (hereinafter abbreviated to MAO) was added and ethylen was fet with stirring to elevate the pressure to 6 Kg/cm² G. Thereafter, the pressure of the autoclave was released. The pressuring and releasing procedure was repeated 3 times. After that, the temperature was reached to 30° C. in the presence of ethylene under ordinary pressure. The system was pressured with ethylene to 6 Kg/cm² G, 1.52 ml of the catalyst solution prepared in the above pre-activation of the catalyst was added and copolymerization of ethylene and isoprene was initiated.

In the copolymerization, the catalyst concentration of isopropylidene bisindenylzirconium dichloride was 0.0123 mmol/l and that of MAO was 7.5 mmol/l per the whole system. During the polymerization, the inner pressure was kept at 6 Kg/cm² G by feeding ethylene continuously. After 30 minutes, the polymerization reaction was stopped by adding methyl alcohol.

After releasing the pressure, a polymer solution was taken out and washed with the same amount of a water solution prepared by adding 5 ml of concentrated hydrochloric acid to 1 l of water. The catalyst residue was transferred to a water phase. The contact mixed solution was allowed to stand, and the water phase was separated and removed. Furthermore, the polymerization liquid phase was washed with a distilled water twice, to divide into oil and water.

Subsequently, the oil and water separated polymerization liquid phase was brought to contact with 3 times the amount of acetone with vigorously stirring, to precipitate a polymer. The polymer was thoroughly washed with acetone and filtered, to collect a solid part (copolymer). The copolymer was dried in a stream of nitrogen at 130° C. at 350 mmHg for 12 hr. The yield of the ethylene/isoprene copolymer thus prepared was 47 g, the intrinsic viscosity [η], as measured in decalin at 135° C., was 1.5 dl/g, the glass transition temperature Tg was −30° C., the iodine value was 27 g/100 g, the ethylene content was 97 mol %, the ring structure was 1.5 mol %, the 1,2-addition structure was 0.04 mol %, the 3,4-addition structure was 0.96 mol %, the 1,4-addition structure was 0.5 mol % and the activity was 26 Kg/mmolZr·hr.

The results are shown in Table 7.

EXAMPLE B2

The procedure of Example B1 was repeated except that 5500 ml of propylene (25° C. 1 atmospheric pressure) was additionally introduced, the amount of isoprene was changed to 60 ml and the reaction temperature was changed to 20° C. The yield of the resulting ethylene/propylenel isoprene copolymer was 18.8 g, the intrinsic viscosity [η], as measured in decalin at 135° C. was 1.4 dl/g, the glass transition temperature Tg was −40° C., the iodine value was 15 g/100 g, the ethylene content was 68.8 mol %, the propylene content was 25.7 mol %, the ring structure was 3.5 mol %, the 1,2-addition structure was 0.05 mol %, the 3,4-addition structure was 1.25 mol %, the 1,4-addition structure was 0.7 mol % and the activity was 10 Kg/mmolZr·-hr.

The results are shown in Table 7.

EXAMPLE B3

To a 200 ml glass autoclave thoroughly replaced with nitrogen, 38 ml of toluene and 6 g of the ethylene/propylene/isoprene copolymer prepared in Example B2 were introduced and the, temperature was raised to 140° C. with stirring of the mixture. In another vessel, 1.06 g of maleic anhydride and 0.18 g of dicumyl peroxide were dissolved in 8 ml of toluene, to prepare a solution. The solution was added dropwise to the autoclave over 3.5 hr at a uniform rate, and then stirred for 30 min. During the dropping, the temperature was gradually raised to 160° C. After completion of the reaction, the reaction solution was cooled to 70° C. and added to 200 ml of methanol, to precipitate a polymer. The precipitated polymer was further washed with 200 ml of acetone and dried in vacuum at 130° C. for 12 hr, to prepare a graft modified ethylene/propylene/isoprene copolymer. In the resulting modified polymer, 3.5% by weight of maleic anhydride was modified. The intrinsic viscosity [η] of the modified polymer, as measured in decalin at 135° C. was 1.4 dl/g.

TABLE 7

| | Example | |
|---|---|---|
| Constituting unit (mol %) | B1 E/IP | B2 E/P/IP |
| 1,2-adduct | 0.04 | 0.05 |
| 3,4-adduct | 0.96 | 1.25 |
| 1,4-adduct | 0.5 | 0.7 |
| 5-membered ring (cyclopentane ring) | 1.5 | 3.5 |
| Ethylene unit | 97 | 68.8 |
| Propylene unit | | 25.7 |
| Tg (° C.) | −30 | −40 |
| Tm (° C.) | 100 | — |
| Intrinsic viscosity [η] (dl/g) | 1.5 | 1.4 |
| Iodine value IV (g/100 g) | 27 | 15 |
| Catalyst activity (Kg/mmolZr · hr) | 26 | 10 |

E: ethylene, BD: 1,3-butadiene, P: propylene, IP: isoprene

EXAMPLE B4

Production of Vulcanized Rubber

The copolymer prepared in Example B2, zinc white, stearic acid, HAF carbon black (HAF Asahi #70™ manufactured by Asahi Carbon Co.), a vulcanization accelerator MBT (Sanceler MBT™, manufactured by Sanshin Chemical Co. Ltd.), a vulcanization accelerator TMTD (Sanceler TT™, manufactured by Sanshin Chemical Co. Ltd.) and sulfur were added in the following amounts. They were kneaded in an open roll (front roll/back roll: 50/60° C., 16/18 rpm), to prepare an unvulcanized compounded rubber.

Compounding Composition

| | |
|---|---|
| Copolymer prepared in Example B2 | 100 parts by weight |
| Zinc white | 5 parts by weight |
| Stearic acid | 1 parts by weight |
| HAF carbon black | 50 parts by weight |
| Vulcanization accelerator MBT | 0.5 parts by weight |
| Vulcanization accelerator TMTD | 1.0 parts by weight |
| sulfur | 1.5 parts by weight |

The unvulcanized compounded rubber was heated for 20 min. by a press heated at 160° C., to prepare a vulcanized sheet. Then, the sheet was subjected to the tensile, hardness and compression permanent set tests under the conditions as described above.

The tensile strength TB(MPa) was 20, the elongation EB(%) was 270 and the hardness HS(JIS A) was 76.

The results are shown in Table 8.

COMPARATIVE EXAMPLE B1

The procedure of Example B4 was repeated except that the copolymer prepared in Example B2 was not used and an ethylene/propylene/5-vinyl-2-norbornene copolymer rubber (ethylene:propylene=71:29 (molar ratio), Iodine value=9 g/100 g, [η]=2.12 dl/g) was used. Vulcanization was not attained and hence physical properties were not measured.

The results are shown in Table 8.

TABLE 8

| | Example B4 | Comparative Example B1 |
|---|---|---|
| Vulcanization properties | | |
| TB (MPa) | 20 | un-vulcanized |
| EB (%) | 270 | |
| HS (JIS A) CS (%) | 76 | |

EXAMPLE B5

The procedure of Example A9 was repeated except for using the rubber prepared in Example B2 and the oil resistance was evaluated. In result, ΔV(%) was 102%.

COMPARATIVE EXAMPLE B2

The oil resistance-evaluating procedure of Example B5 was repeated by using ENB-EPT copolymer (ethylene/propylene/ethylidene norbornene copolymer) having a component ratio of ethylene/propylene/ENB of 70.2/27.9/1.9 (molar ratio), an intrinsic viscosity [η] of 1.5 dl/g and an iodine value of 15 g/100 g.

In result, ΔV(%) was 125%.

EXAMPLE B6

40 g of the ethylene/isoprene copolymer prepared in Example B1 was collected. 0.04 g of 2,5-dimethyl-2,5-ditertbutylperoxyhexane was mixed with the copolymer and kneaded at 200° C. for 3 min. in a labo plastmill at 100 rpm, and then was cross-linked.

The cross-linked polymer had a haze of 12%, indicative temperature of heat resistance of 115° C., Young's modulus (YM) of 98 MPa, a Martens hardness of 10.6 mm$^{-1}$.

The ethylene/isoprene copolymer before cross-linking had a haze of 10%, indicative temperature of heat resistance of 112° C., a Young's modulus of 94 MPa, a Martens hardness of 9.6 mm$^{-1}$.

These physical properties were measured by the following methods. Haze (%):

A 1.0 mm thick sheet is molded and measured by a digital turbidity meter DH-20D manufactured by Nippon Denshoku Kogyo Ltd.

Martens Hardness(/mm):

The test piece is torn with a Martens scratch hardness tester and an inverse number of its width torn is measured.

Heat Resistance Test:

A load of 2 Kg/cm$^2$ is applied to a 2 mm thick sample in accordance with JIS K 7196, the temperature is raised at 5°

C./min. A penetration temperature was obtained from a TMA (thermal mechanical analysis) curve, the temperature is taken as the indication of heat resistance.

Young's Modulus (YM) (MPa):

A JIS 3 dumbbell is set between chucks at an interval of 30 mm and YM is measured at a tensile rate of 30 mm/min. at room temperature (23° C.).

SYNTHETIC EXAMPLE C1

Pre-activation of Catalyst

In a glass vessel thoroughly replaced with nitrogen, 13.5 mg of (dimethyl(t-butyl amide)(tetramethyl-$\eta^5$-cyclopentadienyl)silane)dichloride titanium synthesized by a known method was weighed. 22.86 ml of a 0.808 mmol/ml toluene solution of methyl almoxane (abbreviated to MAO hereinafter), which was equal to 22.05 mmol of aluminum atom, was added. Then, the mixture was irradiated with ultrasonic waves at 23° C. for 15 min, to prepare a catalyst solution.

Synthesis of Ethylene/butadiene/styrene Copolymer

To a 2 l autoclave dried under reduced pressure and replaced with nitrogen, 440.6 ml of toluene and 30 ml of styrene were added at ordinary temperature and ethylene was fed with stirring to elevate the pressure to 6 Kg/cm² G. Thereafter, the pressure of the autoclave was released. The pressuring and releasing procedure was repeated 3 times.

Thereafter, 18 ml of 1,3-butadiene (25° C., 1 atmospheric pressure) was added in the presence of ethylene under ordinary pressure and the temperature of the autoclave was raised to 30° C. Then the system was pressured with ethylene to 6 Kg/cm² G, 3.11 ml of the catalyst solution prepared in the above pre-activation of the catalyst was added and copolymerization of ethylene, styrene and 1,3-butadiene was initiated. In the copolymerization, the catalyst concentration of (dimethyl(t-butyl amide)(tetramethyl-$\eta^5$-cyclopentadienyl)silane)dichloride titanium was 0.01 mmol/l and that of MAO was 6.0 mmol/l per the whole system. During the polymerization, the inner pressure was kept at 6 Kg/cm² G by feeding ethylene continuously. After 15 minutes, the polymerization reaction was stopped by adding methyl alcohol. After releasing the pressure, a polymer solution was taken out and washed with the same amount of a water solution prepared by adding 5 ml of concentrated hydrochloric acid to 1 l of water, so that the catalyst residue was transferred to a water phase.

The contact mixed solution was allowed to stand, the water phase was separated and removed. Furthermore, the polymerization liquid phase was washed with a distilled water twice, to divide into oil and water. Subsequently, the oil and water separated polymerization liquid phase was brought to contact with 3 times the amount of acetone with vigorously stirring, to precipitate a polymer. The polymer was thoroughly washed with acetone and filtered to collect a solid part (copolymer). The copolymer was dried in a stream of nitrogen at 130° C. at 350 mmHg for 12 hr.

The yield of the ethylene/styrene/1,3-butadiene copolymer thus prepared was 13 g, the intrinsic viscosity [η], as measured in decalin at 135° C., was 2.0 dl/g, the glass transition Tg was −30° C., the iodine value was 22 g/100 g, the ethylene content was 86.7 mol %, the styrene content was 4.0 mol %, the 5-membered ring structure was 5.9 mol %, the cyclopropane ring structure was 0.2 mol %, the 1,2-addition structure was 0.7 mol %, the 1,4-addition structure was 2.5 mol % and the activity was 10.4 Kg/mmolZr·hr.

The results are shown in Table 9.

EXAMPLE C2

The procedure of Example C1 was repeated except that 4400 ml of propylene (25° C. 1 atmospheric pressure) was additionally introduced, the amount of 1,3-butadiene was changed to 13 ml, the amount of styrene was changed to 50 ml and the reaction temperature was changed to 20° C. The yield of the resulting ethylene/propylene/styrene/1,3-butadiene copolymer was 9 g, the intrinsic viscosity [η], as measured in decalin at 135° C., was 2.1 dl/g, the glass transition temperature Tg was −44° C., the iodine value was 17.5 g/100 g, the ethylene content was 63.6 mol % the propylene content was 23.7 mol %, the styrene content was 5.4 mol %, the 5-membered ring structure was 4.8 mol %, the cyclopropane ring structure was 0.1 mol %, the 1,2-addition structure was 0.5 mol %, the 1,4-addition structure was 1.9 mol % and the activity was 7.2 Kg/mmolZr·hr.

The results are shown in Table 9.

EXAMPLE C3

To a 200 ml glass autoclave thoroughly replaced with nitrogen, 38 ml of toluene and 6 g of the ethylene/propylene/styrene/1,3-butadiene copolymer prepared in Example C2 were introduced and the temperature was raised to 140° C. with stirring of the mixture. In another vessel, 1.06 g of maleic anhydride and 0.18 g of dicumyl peroxide were dissolved in 8 ml of toluene, to prepare a solution. The solution was added dropwise to the autoclave over 3.5 hr at a uniform rate, and then stirred for 30 min. During the dropping, the temperature was gradually raised to 160° C. After completion of the reaction, the reaction solution was cooled to 70° C. and added to 200 ml of methanol, to precipitate a polymer. The precipitated polymer was further washed with 200 ml of acetone and dried in vacuum at 130° C. for 12 hr, to prepare a graft modified ethylene/propylene/styrene/1,3-butadiene copolymer. In the resulting modified polymer, 3.5 wt % of maleic anhydride was modified. The intrinsic viscosity of the modified polymer, as measured in decalin at 135° C., was 2.0 dl/g.

TABLE 9

|  | Example | |
| --- | --- | --- |
| Constituting unit (mol %) | C1<br>E/S/BD | C2<br>E/P/S/BD |
| 1,2-adduct | 0.7 | 0.5 |
| 3,4-adduct |  |  |
| 1,4-adduct | 2.5 | 1.9 |
| 5-membered ring (cyclopentane ring) | 5.9 | 4.8 |
| 3-membered ring (cyclopentane ring) | 0.2 | 0.1 |
| Ethylene unit | 86.7 | 63.6 |
| Propylene unit |  | 23.7 |
| Styrene unit | 4.0 | 5.4 |
| Tg (° C.) | −30 | −44 |
| Tm (° C.) | 52 | — |
| Intrinsic viscosity [η] (dl/g) | 2.0 | 2.1 |
| Iodine value IV (g/100 g) | 22 | 17.5 |
| Catalyst activity (Kg/mmolZr · hr) | 10.4 | 7.2 |
| Mw/Mn | 2.5 | 2.5 |

E: ethylene, BD: 1,3-butadiene, P: propylene, S: styrene

EXAMPLE C4

Production of Vulcanized Rubber

The copolymer prepared in Example C2, zinc white, stearic acid, HAF carbon black (HAF Asahi #70™, manufactured by Asahi Carbon Co.) and dicumylperoxide (DCP-40C) were added in the following amounts. They were kneaded in an open roll (front roll/back roll: 50/60° C., 16/18 rpm), and an unvulcanized compounded rubber was prepared.

Compounding Composition

| Copolymer prepared in Example C2 | 100 parts by weight |
|---|---|
| Zinc white | 5 parts by weight |
| Stearic acid | 1 parts by weight |
| HAF carbon black | 50 parts by weight |
| Dicumylperoxide (DCP-40C) | 7 parts by weight |

The unvulcanized compounded rubber was heated for 15 min. by a press heated at 170° C., to prepare a vulcanized sheet. Then, the vulcanized sheet was subjected to tensile, hardness and compression permanent set tests under the conditions as described above.

The tensile strength TB(MPa) was 21, the elongation EB(%) was 210, the hardness HS(JISA) was 72 and the compression permanent set (CS) (%) was 14.

The results are shown in Table 10.

COMPARATIVE EXAMPLE C1

The procedure of Example C4 was repeated except that the copolymer prepared in Example C2 was not used and an ethylene/propylene/styrene/5-ethylidene-2-norbornene copolymer rubber (ethylene:propylene=74:26 (molar ratio), Styrene content=4.6 mol %, Iodine value=18 g/100 g, [η]= 1.45 dl/g) was used.

The tensile strength TB(MPa) was 20, the elongation EB(%) was 260, the hardness HS(JIS A) was 70 and the compression permanent set (CS) (%) was 22.

The results are shown in Table 10.

TABLE 10

|  | Example C4 | Comparative Example C1 |
|---|---|---|
| Vulcanization properties |  |  |
| TB (MPa) | 21 | 20 |
| EB (%) | 210 | 260 |
| HS (JIS A) CS (%) | 72 | 70 |
| CS (%) | 14 | 22 |

EXAMPLE C5

Synthesis of Ethylene/propylene/styrene/1,3-butadiene

The procedure of Example C1 was repeated except that 3900 ml of propylene (25° C., 1 atmospheric pressure) was additionally introduced, the amount of catalyst solution was changed to 1.56 ml and the reaction temperature was changed to 20° C.

The yield of the resulting ethylene/propylene/styrene/1,3-butadiene copolymer was 4.2 g, the intrinsic viscosity [η], as measured in decalin at 135° C., was 2.5 dl/g, the glass transition temperature Tg was -42° C., the iodine value was 21 g/100 g, the ethylene content was 67.8 mol %, the propylene content was 18.9 mol %, the styrene content was 5.4 mol %, the 5-membered ring structure was 4.8 mol %, the cyclopropane ring structure was 0.1 mol %, the 1,2-addition structure was 0.5 mol %, the 1,4-addition structure was 1.9 mol % and the activity was 7.2 Kg/mmolZr·hr.

Production of Vulcanized Rubber

The ethylene/propylene/styrene/1,3-butadiene copolymer thus prepared, zinc white, stearic acid, HAF carbon black (HAF Asahi #70™, manufactured by Asahi Carbon Co.) and dicumylperoxide (DCP-40C) were added in the following amounts. They were kneaded in an open roll (front roll/back roll: 50/60° C., 16/18 rpm), to prepare an unvulcanized compounded rubber.

Compounding Composition

| Ethylene/propylene/styrene/1,3-butadiene copolymer | 100 parts by weight |
|---|---|
| Zinc white | 5 parts by weight |
| Stearic acid | 1 parts by weight |
| HAF carbon black | 50 parts by weight |
| DCP-40C | 7 parts by weight |

The unvulcanized compounded rubber was heated for 15 min. by a press heated at 170° C., to prepare a vulcanized sheet. The tensile strength TB(MPa) of the sheet was 23, the elongation EB(%) was 230, the hardness HS(JIS A) was 76 and the permanent compression set (CS) (%) was 12. Surface tackiness was not observed.

The sheet was suitable for using as a glass run channel.

Furthermore, by adjusting the roll nip to 1 nm, the unvulcanized rubber was separately taken out and subjected to cross-linking for 10 min. in an oven heated at 220° C. Surface tackiness was not observed.

The results are shown in Table 11.

TABLE 11

| Vulcanization Physical properties | Example C5 |
|---|---|
| TB (MPa) | 23 |
| EB (%) | 230 |
| HS (JIS A) | 76 |
| CS (%) | 12 |
| Surface tackiness | none |

EXAMPLE C6

The procedure of Example C1 was repeated except that the catalyst was changed to isopropylidene-bis(indenyl) zirconium dichloride synthesized by a known method, to prepare an ethylene/styrene/butadiene copolymer.

The yield of the resulting ethylene/styrene/butadiene copolymer was 2.5 g, the intrinsic viscosity [η], as measured in decalin at 135° C., was 1.1 dl/g, the glass transition temperature Tg was -25° C., the iodine value was 15 g/100 g, the ethylene content was 88.0 mol %, the styrene content was 4.5 mol %, the 5-membered ring structure was 4.8 mol %, the cyclopropane ring structure was 0.2 mol %, the 1,2-addition structure was 0.6 mol %, the 1,4-addition structure was 1.9 mol % and the activity was 2 Kg/mmolZr·hr.

EXAMPLE C7

The procedure of Example A9 was repeated except for using the rubber prepared in Example C2, and the oil resistance was evaluated. In result, ΔV(%) was 91%.

COMPARATIVE EXAMPLE C2

The procedure of Example C7 was repeated except for using ENB-EPT copolymer (ethylene/propylene/ethylidene norbornene copolymer) having a component ratio of ethylene/propylene/styrene/ENB of 65.7/26.7/5.3/2.3 (molar ratio), an intrinsic viscosity [η] of 2.0 dl/g and an iodine value of 18 g/100 g. Then, the oil resistance was evaluated. In result, ΔV(%) was 112%.

What is claimed is:

1. An unsaturated copolymer which is a copolymer of an α-olefin of 2 to 12 carbon atoms and a conjugated diene monomer represented by the following formula (I-a):

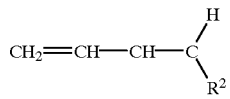
(I-a)

wherein
$R^2$ is a hydrogen atom, an alkyl group of 1 to 8 carbon atoms or an aryl group,
said unsaturated copolymer having the following properties:
(a) in said copolymer, 1,2-addition units (including 3,4-addition units) derived from the conjugated diene monomer (I-a) form double bonds in the side chain of the copolymer, 1,4-addition units derived from the conjugated diene monomer (I-a) form double bonds in the main chain of the copolymer, and, the quantity ratio of the double bonds of the side chain derived from the 1,2-addition units to the double bonds of the main chain derived from the 1,4-addition units (side chain double bonds derived from the 1,2-addition units/main chain double bonds derived from 1,4-addition units) is in the range of 10/90 to 99/1,
(b) five-membered rings are present in the main chain of said copolymer, and
(c) the quantity ratio of the double bonds from all of the addition units to the five-membered rings (total of double bonds from all addition units/five-membered rings) is in the range of 20/80 to 90/10.

2. The unsaturated copolymer as claimed in claim 1, wherein the conjugated diene monomer is 1,3-butadiene.

3. The unsaturated copolymer as claimed in claim 1, wherein the α-olefin is ethylene or a combination of ethylene and an α-olefin of 3 to 12 carbon atoms, and in the case of said combination, the molar ratio of ethylene to the α-olefin of 3 to 12 carbon atoms is in the range of 99/1 to 40/60.

4. The unsaturated copolymer as claimed in claim 1, wherein the constituent units derived from the conjugated diene monomer are contained in the copolymer in the total amount of 0.01 to 30% by mol.

5. The unsaturated copolymer as claimed in claim 1, which has an iodine value of 1 to 50 g/100 g, an intrinsic viscosity (η), as measured in decahydronaphthalene at 135° C., of 0.01 to 10 dl/g and a glass transition temperature Tg of not higher than 25° C.

6. An unsaturated copolymer-containing elastomer composition comprising:
(a) the copolymer as claimed in claim 1, and
(b) a crosslinking agent and/or a filler.

7. A process for preparing the unsaturated copolymer as claimed in claim 1, said process comprising:

copolymerizing an α-olefin of 2 to 12 carbon atoms and at least one conjugated diene monomer represented by the following formula (I-a):

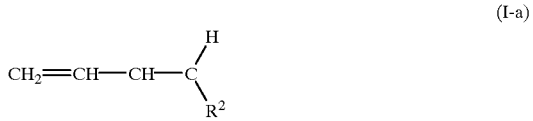
(I-a)

wherein
$R^2$ is a hydrogen atom, an alkyl group of 1 to 8 carbon atoms or an aryl group,
in the presence of a catalyst;
said catalyst being at least one catalyst system comprising the following component (a):
(a) a transition metal complex represented by the following formula (II) or (III):

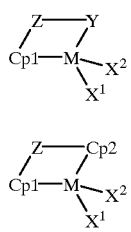

wherein
M is Ti, Zr, Hf, Nd, Sm or Ru; Cp1 and Cp2 are each a cyclopentadienyl group, an indenyl group, a fluorenyl group or any of their derivatives, that is π-bonded to M; $X^1$ and $X^2$ are each an anionic ligand or a neutral Lewis base ligand; Y is a ligand containing a nitrogen atom, an oxygen atom, a phosphorus atom or a Sulfur atom; and Z is C, O, B, S, Ge, Si, Sn or a group containing any of these atoms,
and at least one compound selected from the following components (b), (c) and (d):
(b) a compound which reacts with the transition metal M in the component (a) to form an ionic complex,
(c) an organoaluminum compound, and
(d) aluminoxane.

8. An unsaturated copolymer of an α-olefin of 2 to 12 carbon atoms and conjugated diene monomer represented by the following formula (I-b):

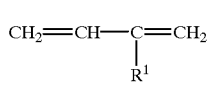
(I-b)

wherein
R1 is an alkyl group of 1 to 8 carbon atoms or an aryl group,
wherein the constituent units derived from the conjugated diene monomer are contained in the copolymer in the total amount of 0.01 to 30% by mol, and
said unsaturated copolymer having the following properties:
(a) in said copolymer, 1,2-addition units (including 3,4-addition units) derived from the conjugated diene monomer (I-b) form double bonds in the side chain of the copolymer, 1,4-addition units derived from the conjugated diene monomer (I-b) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 5/95 to 99/1.

9. An unsaturated copolymer of an α-olefin of 2 to 12 carbon atoms and a conjugated diene monomer represented by the following formula (I-b):

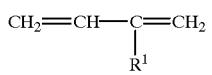

(I-b)

wherein

R1 is an alkyl group of 1 to 8 carbon atoms or an aryl group, said unsaturated copolymer having the following properties:
(a) in said copolymer, 1,2-addition units (including 3,4-addition units) derived from the conjugated diene monomer (I-b) form double bonds in the side chain of the copolymer, 1,4-addition units derived from the conjugated diene monomer (I-b) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 5/95 to 99/1,
(b) five-membered rings are present in the main chain of said copolymer, and
(c) the quantity ratio of the double bonds from all of the addition units to the five-membered rings (total of double bonds from all addition units/five-membered rings) is in the range of 20/80 to 90/10.

10. A process for preparing the unsaturated copolymer as claimed in claim 8, said process comprising copolymerizing an α-olefin of 2 to 12 carbon atoms and at least one conjugated diene monomer represented by the following formula (I-b):

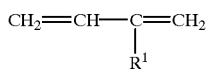

(I-b)

wherein

R$^1$ is an alkyl group of 1 to 8 carbon atoms or an aryl group, in the presence of a catalyst;

said catalyst being at least one catalyst system comprising the following component (a):
(a) a transition metal complex represented by the following formula (II) or (III):

wherein

M is Ti, Zr, Hf, Nd, Sm or Ru; Cp1 and Cp2 are each a cyclopentadienyl group, an indenyl group, a fluorenyl group or any of their derivatives, that is π-bonded to M; X$^1$ and X$^2$ are each an anionic ligand or a neutral Lewis base ligand; Y is a ligand containing a nitrogen atom, an oxygen atom, a phosphorus atom or a sulfur atom; and Z is C, O, B, S, Ge, Si, Sn or a group containing any of these atoms, and at least one compound selected from the following components (b), (c) and (d):
(b) a compound which reacts with the transition metal M in the component (a) to form an ionic complex,
(c) an organoaluminum compound, and
(d) aluminoxane.

11. An unsaturated random copolymer of an α-olefin of 2 to 12 carbon atoms, an aromatic vinyl compound and a conjugated diene monomer, which conjugated diene monomer is represented by the following formula (I):

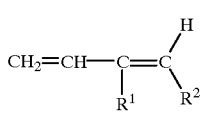

(I)

wherein

R$^1$ and R$^2$ are each independently a hydrogen atom, an alkyl group of 1 to 8 carbon atoms or an aryl group, and at least one of R$^1$ and R$^2$ is a hydrogen atom, said unsaturated copolymer having the following properties:
(a) in said copolymer, 1,2-addition units (including 3,4-addition units) derived from the conjugated diene monomer (I) form double bonds in the side chain of the copolymer, 1,4-addition units derived from the conjugated diene monomer (I) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 10/90 to 99/1.

12. The unsaturated copolymer as claimed in claim 11, which is a copolymer of an α-olefin of 2 to 12 carbon atoms, an aromatic vinyl compound and a conjugated diene monomer represented by the following formula (I)

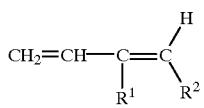

(I)

wherein
R[1] and R[2] are each independently a hydrogen atom, an alkyl group of 1 to 8 carbon atoms or an aryl group, and at least one of R[1] and R[2] is a hydrogen atom,
said unsaturated copolymer having the following properties:
(a) in said copolymer, 1,2-addition units (including 3,4-addition units) derived from the conjugated diene monomer (I) form double bonds in the side chain of the copolymer, 1,4-addition units derived from the conjugated diene monomer (I) form double bonds in the main chain of the copolymer, and the quantity ratio of the double bonds of the side chain derived from the 1,2-addition units to the double bonds of the main chain derived from the 1,4-addition units (side chain double bonds derived from 1,2-addition units/main chain double bonds derived from 1,4-addition units) is in the range of 10/90 to 99/1,
(b) five-membered rings are present in the main chain of said copolymer,
(c) the quantity ratio of the double bonds from all of the addition units to the five-membered rings (total of double bonds from all addition units/five-membered rings) is in the range of 20/80 to 90/10, and
(d) the constituent units derived from the aromatic vinyl compound are contained in an amount of 0.1 to 60% by mol.

13. The unsaturated copolymer as claimed in claim 11, wherein the constituent units derived from the conjugated diene monomer are contained in the copolymer in the total amount of 0.01 to 30% by mol.

14. The unsaturated copolymer as claimed in claim 11, wherein the conjugated diene monomer is 1,3-butadiene.

15. The unsaturated copolymer as claimed in claim 11, wherein the conjugated diene monomer is isoprene.

16. The unsaturated copolymer as claimed in claim 11, wherein the α-olefin is ethylene or a combination of ethylene and an α-olefin of 3 to 12 carbon atoms, and in the case of said combination, the molar ratio of ethylene to the α-olefin of 3 to 12 carbon atoms is in the range of 99/1 to 40/60.

17. The unsaturated copolymer as claimed in claim 11, wherein the aromatic vinyl compound is styrene.

18. The unsaturated copolymer as claimed in claim 11, which has an iodine value of 1 to 50 g/100 g, an intrinsic viscosity (η), as measured in decahydronaphthalene at 135° C., of 0.01 to 10 dl/g and a glass transition temperature Tg of not higher than 25° C.

19. The unsaturated copolymer as claimed in claim 11, wherein the peak of a melting point (Tm) of the copolymer, as measured by DSC, is not higher than 120° C.

20. An unsaturated copolymer-containing elastomer composition comprising:
(a) the unsaturated copolymer as claimed in claim 11, and
(b) a crosslinking agent and/or a filler.

21. A process for preparing the unsaturated copolymer as claimed in claim 11, said process comprising:
copolymerizing an α-olefin of 2 to 12 carbon atoms, an aromatic vinyl compound and at least one conjugated diene monomer represented by the following formula (I):

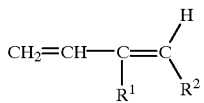

(I)

wherein
R[1] and R[2] are each independently a hydrogen atom, an alkyl group of 1 to 8 carbon atoms or an aryl group, and at least one of R[1] and R[2] is a hydrogen atom,
in the presence of a catalyst;
said catalyst being at least one catalyst system comprising the following component (a):
(a) a transition metal complex represented by the following formula (II) or (III):

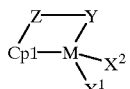

(II)

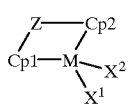

(III)

wherein
M is Ti, Zr, Hf, Nd, Sm or Ru; Cp1 and Cp2 are each a cyclopentadienyl group, an indenyl group, a fluorenyl group or any of their derivatives, that is π-bonded to M; X[1] and X[2] are each an anionic ligand or a neutral Lewis base ligand; Y is a ligand containing a nitrogen atom, an oxygen atom, a phosphorus atom or a Sulfur atom; and Z is C, O, B, S, Ge, Si, Sn or a group containing any of these atoms;
and at least one compound selected from the following components (b), (c) and (d):
(b) a compound which reacts with the transition metal M in the component (a) to form an ionic complex,
(c) an organoaluminum compound, and
(d) aluminoxane.

22. The unsaturated copolymer as claimed in claim 9, wherein the conjugated diene monomer is isoprene.

23. The unsaturated copolymer as claimed in claim 9, wherein the α-olefin is ethylene or a combination of ethylene and an α-olefin of 3 to 12 carbon atoms, and in the case of said combination, the molar ratio of ethylene to the α-olefin of 3 to 12 carbon atoms is in the range of 99/1 to 40/60.

24. The unsaturated copolymer as claimed in claim 9, wherein the constituent units derived from the conjugated diene monomer are contained in the copolymer in the total amount of 0.01 to 30% by mol.

25. The unsaturated copolymer as claimed in claim 9, which has an iodine value of 1 to 50 g/100 g, an intrinsic viscosity (η), as measured in decahydronaphthalene at 135° C., of 0.01 dl/g and a glass transition temperature Tg, as measured by DSC, of not higher than 25° C.

26. An unsaturated copolymer-containing elastomer composition comprising:
(a) the copolymer as claimed in claim 9, and
(b) a crosslinking agent and/or a filler.

27. A process for preparing the unsaturated copolymer as claimed in claim 9, said process comprising copolymerizing an α-olefin of 2 to 12 carbon atoms and at least one conjugated diene monomer represented by the following formula (I-b):

$$CH_2=CH-\underset{R^1}{C}=CH_2 \quad \text{(I-b)}$$

wherein

R1 is an alkyl group of 1 to 8 carbon atoms or an aryl group, in the presence of a catalyst;

said catalyst being at least one catalyst system comprising the following component (a):

(a) a transition metal complex represented by the following formula (II) or (III):

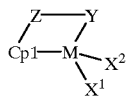  (II)

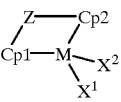  (III)

M is Ti, Zr, Hf, Nd, Sm or Ru; Cp1 and Cp2 are each a cyclopentadienyl group, an indenyl group, a fluorenyl group or any of their derivatives, that is π-bonded to M; $X^1$ and $X^2$ are each an anionic ligand or a neutral Lewis base ligand; Y is a ligand containing a nitrogen atom, an oxygen atom, a phosphorus atom or a sulfur atom; and Z is C, O, B, S, Ge; Si, Sn or a group containing any of these atoms, and at least one compound selected from the following components (b), (c) and (d):

(b) a compound which reacts with the transition metal M in the component (a) to form an ionic complex, (c) an organoaluminum compound, and (d) aluminoxane.

* * * * *